US011022179B2

(12) United States Patent
Moriyama et al.

(10) Patent No.: US 11,022,179 B2
(45) Date of Patent: Jun. 1, 2021

(54) SHAFT COUPLING STRUCTURE AND TELESCOPIC SHAFT

(71) Applicant: NSK Ltd., Tokyo (JP)

(72) Inventors: Seiichi Moriyama, Maebashi (JP); Keisuke Nakao, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 16/636,163

(22) PCT Filed: Aug. 2, 2018

(86) PCT No.: PCT/JP2018/029058
§ 371 (c)(1),
(2) Date: Feb. 3, 2020

(87) PCT Pub. No.: WO2019/027004
PCT Pub. Date: Feb. 7, 2019

(65) Prior Publication Data
US 2020/0378445 A1 Dec. 3, 2020

(30) Foreign Application Priority Data

Aug. 4, 2017 (JP) .............................. JP2017-151624

(51) Int. Cl.
*F16D 1/027* (2006.01)
*B62D 1/19* (2006.01)
(Continued)

(52) U.S. Cl.
CPC .............. *F16D 1/027* (2013.01); *B62D 1/19* (2013.01); *B62D 1/20* (2013.01); *F16C 3/03* (2013.01);
(Continued)

(58) Field of Classification Search
CPC ...... F16D 1/027; F16D 3/065; F16D 2300/26; B62D 1/19; B62D 1/20; F16C 3/03;
(Continued)

(56) References Cited

U.S. PATENT DOCUMENTS 2,714,809 A * 8/1955 Voss ........................ D06F 13/00
403/359.6
5,954,362 A 9/1999 Aota
(Continued)

FOREIGN PATENT DOCUMENTS

EP 2 039 587 A1 3/2009
EP 2 735 752 A2 5/2014
(Continued)

OTHER PUBLICATIONS

International Search Report (PCT/ISA/210) issued in PCT Application No. PCT/JP2018/029058 dated Nov. 6, 2018 with English translation (five (5) pages).
(Continued)

*Primary Examiner* — Greg Binda
(74) *Attorney, Agent, or Firm* — Crowell & Moring LLP

(57) ABSTRACT

The shaft coupling structure includes: a male joint, and a female shaft that is coupled to male joint. The outer peripheral surface of the male joint has an outer peripheral side concave-convex portion having a concave-convex shape in the circumferential direction and an annular concave groove, and the inner peripheral surface of the female shaft has an inner peripheral side concave-convex portion having a concave-convex shape in the circumferential direction. The outer peripheral side concave-convex portion and the inner peripheral side concave-convex portion engage with a concave-convex engagement. The outer peripheral surface of the male joint and an end portion on one side of the female shaft in the axial direction are welded and fixed together, and
(Continued)

an embossed portion provided on the inner peripheral surface of the female shaft is arranged on the inner side of the annular concave groove.

16 Claims, 15 Drawing Sheets

(51) Int. Cl.
    *B62D 1/20*     (2006.01)
    *F16C 3/03*     (2006.01)
    *F16C 3/035*     (2006.01)
    *F16D 3/06*     (2006.01)

(52) U.S. Cl.
    CPC .............. *F16C 3/035* (2013.01); *F16D 3/065* (2013.01); *F16C 2326/24* (2013.01); *F16D 2300/26* (2013.01); *Y10T 403/472* (2015.01); *Y10T 403/7033* (2015.01)

(58) Field of Classification Search
    CPC .. F16C 3/035; F16C 2326/24; Y10T 403/472; Y10T 403/7033
    USPC .................................................. 464/167, 182
    See application file for complete search history.

(56) References Cited

U.S. PATENT DOCUMENTS

| | | |
|---|---|---|
| 2001/0039213 A1 | 11/2001 | Oka et al. |
| 2005/0250586 A1 | 11/2005 | Yamada et al. |
| 2014/0147197 A1 | 5/2014 | Yoshida et al. |

FOREIGN PATENT DOCUMENTS

| | | | |
|---|---|---|---|
| JP | 7-165087 | A | 6/1995 |
| JP | 8-198122 | A | 8/1996 |
| JP | 10-45005 | A | 2/1998 |
| JP | 10-249456 | A | 9/1998 |
| JP | 2000-309278 | A | 11/2000 |
| JP | 2002-293252 | A | 10/2002 |
| JP | 2005-178539 | A | 7/2005 |
| JP | 2006-132628 | A | 5/2006 |
| JP | 2007-8286 | A | 1/2007 |
| JP | 2008-110682 | A | 5/2008 |
| JP | 2012-112509 | A | 6/2012 |
| JP | 2013-14220 | A | 1/2013 |
| JP | 2013-32795 | A | 2/2013 |
| JP | 2013-35469 | A | 2/2013 |
| JP | 2013-43516 | A | 3/2013 |
| JP | 2014-105773 | A | 6/2014 |
| JP | 2014-126192 | A | 7/2014 |
| JP | 2017-25964 | A | 2/2017 |
| JP | 2019-82217 | A | 5/2019 |
| WO | WO 2004/020879 | A1 | 3/2004 |

OTHER PUBLICATIONS

Japanese-language Written Opinion (PCT/ISA/237) issued in PCT Application No. PCT/JP2018/029058 dated Nov. 6, 2018 (four (4) pages).

Extended European Search Report issued in European Application No. 18841232.4 dated Apr. 28, 2020 (four (4) pages).

\* cited by examiner

SHAFT COUPLING STRUCTURE AND TELESCOPIC SHAFT

TECHNICAL FIELD

The present invention relates to a shaft coupling structure that constitutes a torque transmitting shaft that is assembled in a steering apparatus or the like of an automobile, and relates to a telescopic shaft that includes the torque transmitting shaft and is configured so that the entire length thereof is able to expand or contract in a normal state and/or in a case where an impact load of a specified magnitude or greater is applied in the axial direction.

BACKGROUND ART

FIG. 18 illustrates a steering apparatus for an automobile described in JP 2017-025964A. The steering apparatus includes a steering wheel 1, a steering shaft 2, a steering column 3, a pair of universal joints 4a, 4b, an intermediate shaft 5, a steering gear unit 6, and a pair of tie rods 7.

The steering wheel 1 is attached to a rear end portion of a steering shaft 2 that is rotatably supported inside the steering column 3. A front end portion of the steering shaft 2 is connected to an input shaft 8 of the steering gear unit 6 via the pair of universal joints 4a, 4b and the intermediate shaft 5. Then, by converting rotation of the input shaft 8 into a linear motion of a rack (not illustrated), the pair of tie rods 7 are pushed and pulled, and a steering angle corresponding to the operation amount of the steering wheel 1 is applied to steered wheels. Note that the front-rear direction refers to the front-rear direction of a vehicle body in which the steering apparatus is assembled.

In the field of steering apparatuses for an automobile, a torque transmitting shaft used for transmitting torque, such as an intermediate shaft or the like, may be formed by coupling a plurality of shafts. In this case, a pair of shafts arranged adjacent to each other is coupled by welding so that torque transmission may be performed between the pair of shafts.

In a steering apparatus for a vehicle as described in JP 2017-025959A, an intermediate shaft is configured by a telescopic shaft in which a pair of shafts is coupled such that the entire length thereof is able to expand or contract in a normal state in which no collision accident has occurred in the vehicle, and/or in a case where a collision accident occurs in the vehicle and a large load that is equal to or greater than a specified value is applied to the intermediate shaft in the axial direction.

PRIOR ART DOCUMENTS

Patent Literature

Patent Literature 1: JP 2017-025964A

SUMMARY OF THE INVENTION

Problem to be Solved by the Invention

In recent years, the demand for reliability of a torque transmitting shaft has been increasing. In the case of a torque transmitting shaft configured by connecting a plurality of shafts, the torque transmitting function may be ensured even in a case where a defect such as cracking or peeling occurs in a welded portion coupling the pair of shafts, and it is also required that the pair of shafts do not become separated.

In view of the circumstances described above, an object of the present invention is to provide a shaft coupling structure of a torque transmission shaft capable of ensuring a torque transmitting function even in a case where defects occur in a welded portion, and preventing a plurality of shafts of the torque transmission shaft from separating, and a telescopic shaft including the torque transmission shaft and capable of contracting over the entire length.

Means for Solving the Problems

The shaft coupling structure of the present invention includes a first shaft, a second shaft, and a weld bead portion.

The first shaft has a first coupling portion. The first coupling portion may have a hollow cylindrical shape, or may have a solid shape.

The second shaft has a second coupling portion having a cylindrical shape into which the first coupling portion is inserted.

The weld bead portion welds and fixes together an end portion in the axial direction of the second coupling portion and a portion of an outer peripheral surface of the first shaft that is exposed from the second coupling portion.

The first coupling portion, on an outer peripheral surface thereof, has an outer peripheral side concave-convex portion having a concave-convex shape in the circumferential direction and is arranged on an end portion on the front side in the insertion direction of the first coupling portion, and an annular concave groove that is arranged farther on the rear side in the insertion direction of the first coupling portion than the outer peripheral side concave-convex portion.

The second coupling portion, on an inner peripheral surface thereof, has an inner peripheral side concave-convex portion having an concave-convex shape in the circumferential direction and constitutes a torque transmitting portion by engaging with the outer peripheral side concave-convex portion with a concave-convex engagement, and a convex embossed portion constitutes a retaining portion with arranged on the inner side of the annular concave groove, and has a concave portion in a portion on an outer peripheral surface thereof that coincide with the embossed portion.

The weld bead portion, the retaining portion, and the torque transmitting portion are arranged side-by-side in this order in the axial direction of the first shaft.

The outer peripheral side concave-convex portion may be press-fitted (lightly pressed) with the inner peripheral side concave-convex portion.

In the present invention, the embossed portion may be arranged at a plurality of locations in the circumferential direction of the second coupling portion.

In this case, the embossed portions may be arranged at two or four locations at uniform intervals in the circumferential direction of the second coupling portion.

Alternatively, the embossed portion may be arranged at one location in the circumferential direction of the second coupling portion.

A gap in the radial direction of the first shaft may be provided between a bottom surface of the annular concave groove and a tip end surface of the embossed portion.

Gaps in the axial direction of the first shaft may be provided between inner side surfaces of the annular concave groove that face each other and an embossed portion.

The first coupling portion may have a first support portion having a cylindrical surface shape that is farther on the rear side in the insertion direction of the first coupling portion than the annular concave groove.

In this case, the first coupling portion may have a second support portion having a cylindrical surface shape between the annular concave groove and the outer peripheral side concave-convex portion.

Alternatively, the first coupling portion, on a portion farther on the rear side in the insertion direction of the first coupling portion than the annular concave groove, may have an auxiliary outer peripheral side concave-convex portion having a concave-convex shape in the circumferential direction that engages with the inner peripheral side concave-convex portion with a concave-convex engagement.

In a first aspect of the telescopic shaft according to the present invention, the telescopic shaft includes a large-diameter shaft; a small-diameter shaft that is fitted inside the large-diameter shaft so as to be able to transmit torque to the large-diameter shaft and displace in the axial direction relative to the large-diameter shaft; and a joint shaft that is coupled to an end portion of the large-diameter shaft in the axial direction.

The large-diameter shaft and the joint shaft are coupled together by the shaft coupling structure according to the present invention, the large diameter shaft is the second shaft, and the joint shaft is the first shaft.

In the first aspect of the telescopic shaft according to the present invention, the telescopic shaft may include a dust cover that is externally fitted to the large-diameter shaft.

Of the large-diameter shaft, the outer diameter from an end portion in the axial direction on the side where the joint shaft is coupled to the portion where the dust cover is externally fitted may be constant in the axial direction.

In a second aspect of the telescopic shaft according to the present invention, the telescopic shaft includes a large-diameter shaft; a small-diameter shaft that is fitted inside the large-diameter shaft so as to be able to transmit torque to the large-diameter shaft and displace in the axial direction relative to the large-diameter shaft; and a joint shaft that is coupled to an end portion of the small-diameter shaft in the axial direction.

The small-diameter shaft and the joint shaft are coupled together by the shaft coupling structure according to the present invention, the small-diameter shaft is the first shaft, and the joint shaft is the second shaft.

In both the first and second aspects of the telescopic shaft according to the present invention, the telescopic shaft may constitute an intermediate shaft of a steering apparatus for an automobile.

In this case, the telescopic shaft may be configured to be able to expand and contract over the entire length in a normal state where no collision accident occurs in the automobile, and may be configured to be able to contract over the entire length only when a collision accident occurs in the automobile and a load of a specified magnitude or greater is applied in the axial direction to the telescopic shaft.

Effect of Invention

With the shaft coupling structure and the telescopic shaft according to the present invention, even in a case where defects occur in a weld portion, it is possible to maintain a torque transmitting function and it is possible to prevent separation of a plurality of shafts of a torque transmitting shaft.

MODES FOR CARRYING OUT THE INVENTION

First Example

Figure 1:
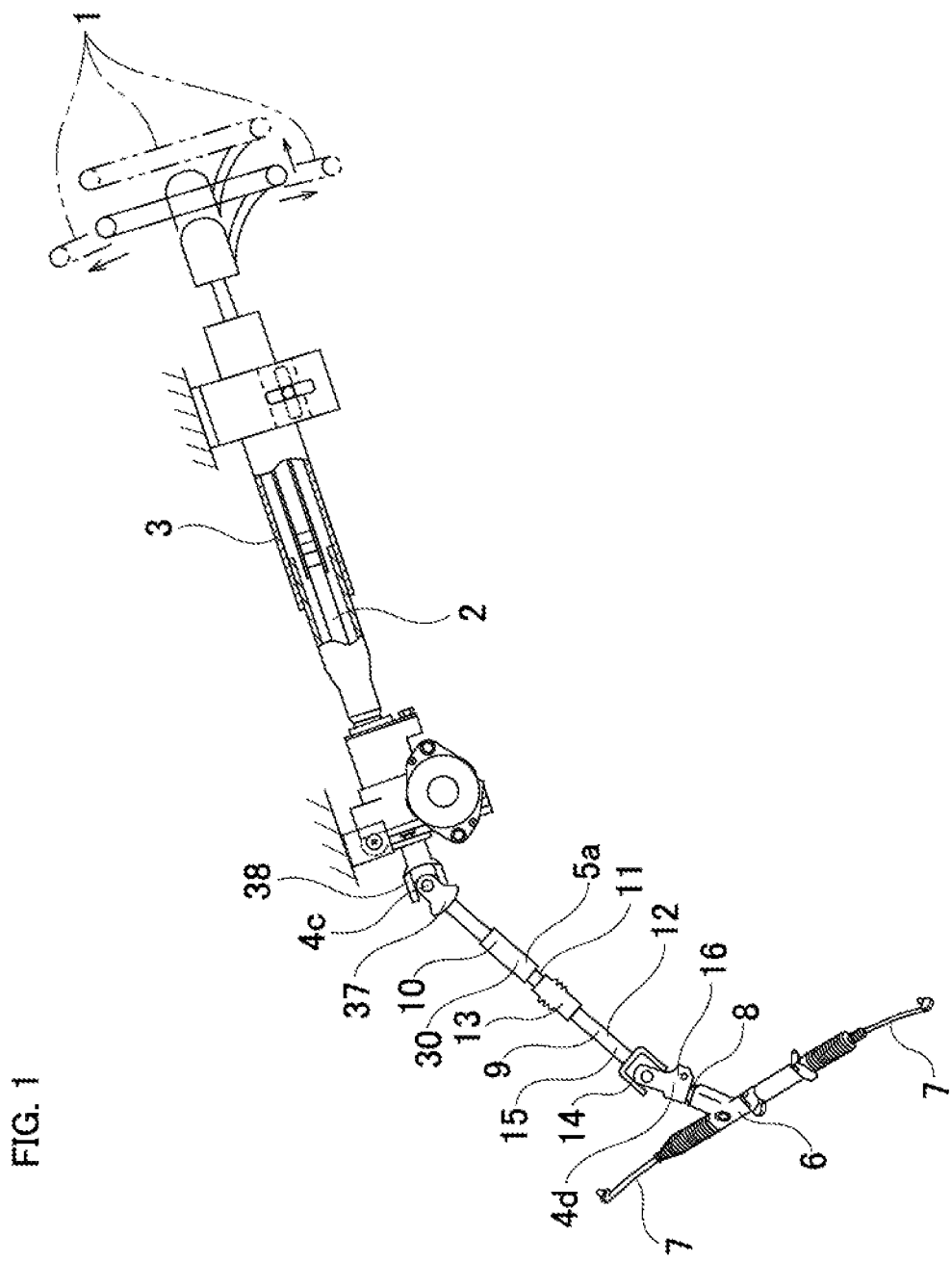
FIG. 1 is a schematic diagram illustrating an example of a steering apparatus to which a shaft coupling structure according to a first example of an embodiment of the present invention is applied.

A first example of an embodiment of the present invention will be described with reference to FIG. 1 to FIG. 13. In the present example, the structure of an intermediate shaft 5a is devised among a plurality of torque transmitting shafts of a steering apparatus. More specifically, of a first telescopic shaft 9 and a second telescopic shaft 10 of the intermediate shaft 5a, the joint structure of a male joint 46 and a female shaft 30 of the second telescopic shaft 10 arranged on the rear side of the vehicle is devised. Hereinafter, the overall structure of the steering apparatus and the intermediate shaft 5a will be described, and the features of the present example will be described.

[Overview of the Steering Apparatus]

A steering apparatus for an automobile includes a steering wheel 1, a steering shaft 2, a steering column 3, a pair of universal joints 4c, 4d, an intermediate shaft 5a, a steering gear unit 6, and a pair of tie rods 7.

The steering shaft 2 is rotatably supported inside the steering column 3 that is supported by the vehicle body. A steering wheel 1 that is operated by a driver is attached to the rear end portion of the steering shaft 2, and the front end portion of the steering shaft 2 is connected to an input shaft 8 of the steering gear unit 6 via the pair of universal joints 4c, 4d and the intermediate shaft 5a. Accordingly, when the driver rotates the steering wheel 1, the rotation of the steering wheel 1 is transmitted to the input shaft 8 of the steering gear unit 6. The rotation of the input shaft 8 is converted into linear motion of a rack that engages with the input shaft 8, and pushes and pulls the pair of tie rods 7. As a result, a steering angle corresponding to the operation amount of the steering wheel 1 is applied to the steered wheels.

[Configuration of the Intermediate Shaft]

Figure 2:
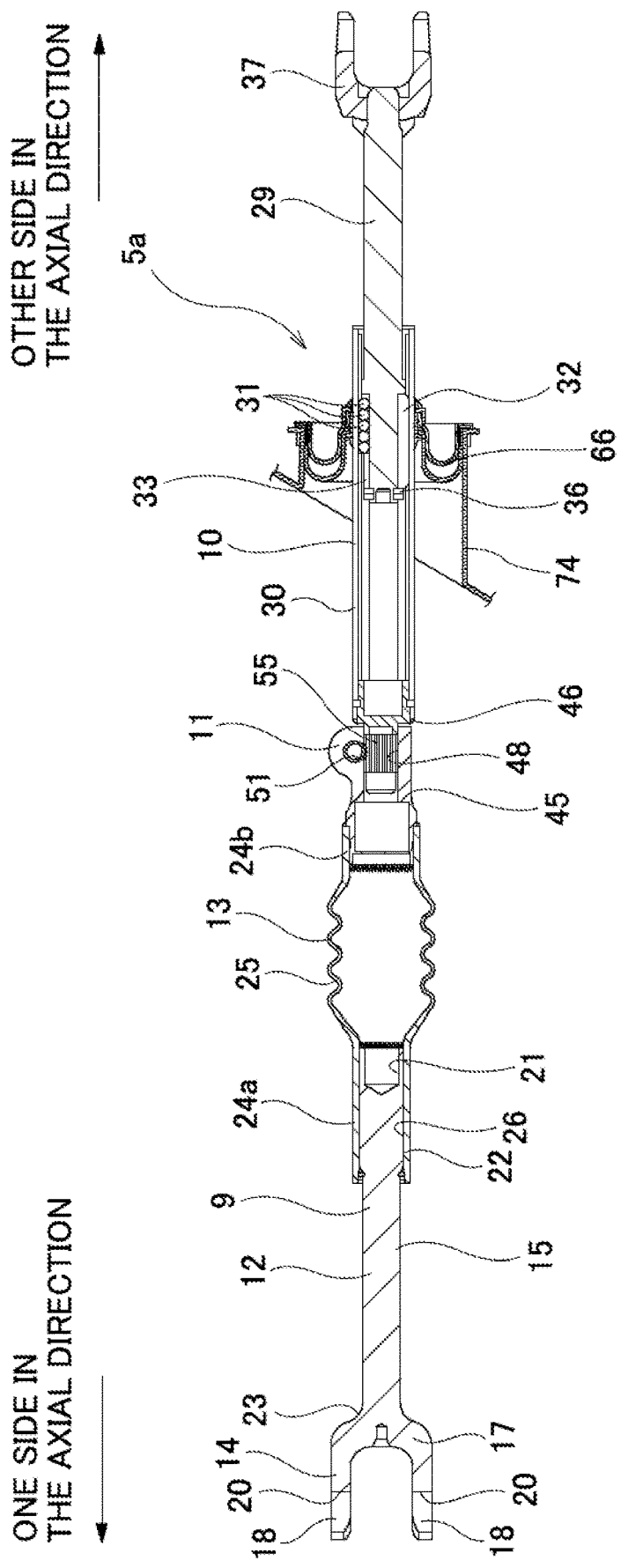
FIG. 2 is a cross-sectional view illustrating an intermediate shaft that is taken out of the steering apparatus of the first example illustrated in FIG. 1.

The intermediate shaft 5a is a torque transmitting shaft that transmits torque, and as illustrated in FIG. 2, is configured by the first telescopic shaft 9 and the second telescopic shaft 10, each of which is capable of expanding or contracting in the axial direction, being coupled in series by a joint member 11 so as to be able to transmit torque. The first telescopic shaft 9 is arranged on the front side and the second telescopic shaft 10 is arranged on the rear side in the front-rear direction of the vehicle body in which the steering apparatus is assembled. In the description of the present invention, for convenience, the side on which the first telescopic shaft 9 is arranged is referred to as one side in the axial direction of the intermediate shaft 5a, and the side on which the second telescopic shaft 10 is arranged is referred to as the other side in the axial direction of the intermediate shaft 5a.

The first telescopic shaft 9 is configured to be able to contract over the entire length only in a case where an impact load having a magnitude greater than or equal to a specified value is applied in the axial direction, whereas the second telescopic shaft 10 is configured to be able to expand and contract over the entire length in a normal state in which no collision accident has occurred. For this reason, in a normal state, the overall length of the intermediate shaft 5a changes only by the expansion or contraction of the second telescopic shaft 10; however, when a collision accident occurs, the overall length is reduced by contraction of both the first telescopic shaft 9 and the second telescopic shaft 10. Note that the intermediate shaft 5a of this embodiment is used in a large vehicle, and has an axial dimension longer than an intermediate shaft used in a general ordinary passenger car.

[Configuration of the First Telescopic Shaft]

Figure 3:
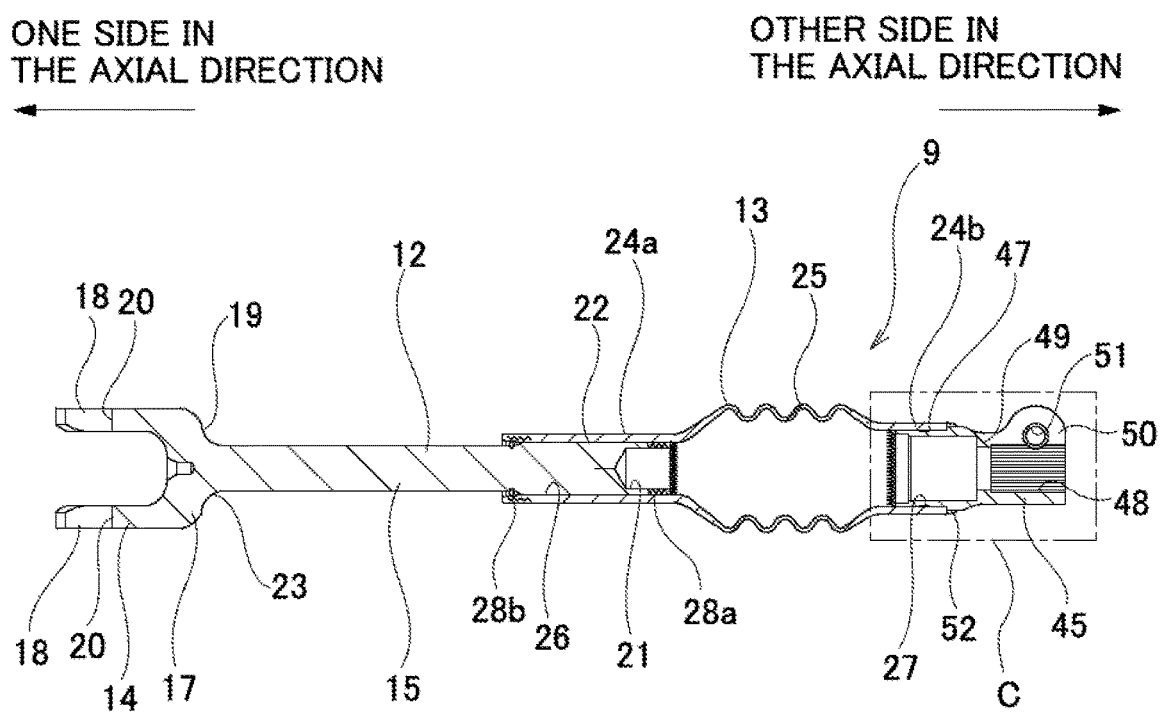
FIG. 3 is a cross-sectional view illustrating a first telescopic shaft that is take out of the intermediate shaft of the first example illustrated in FIG. 2 by separating the first telescopic shaft from the intermediate shaft at a position of a joint member.

As illustrated in FIG. 3, the first telescopic shaft 9 includes an inner shaft 12, an outer tube 13, and a female joint 45. The inner shaft 12 and the outer tube 13 are coupled together so that torque may be transmitted, and so that relative displacement in the axial direction is possible only at the time of a primary collision. In other words, the inner shaft 12 and the outer tube 13 are coupled together so that relative displacement in the axial direction is not possible in the normal state.

The inner shaft 12 is made of metal and has a yoke portion 14 on one side in the axial direction and a shaft portion 15 on the other side in the axial direction. In this example, the yoke portion 14 and the shaft portion 15 are integrally provided. In other words, the yoke portion 14 and the shaft portion 15 are integrally formed by plastically deforming the raw material by forging or the like, instead of being connected by fitting, welding, or the like.

The yoke portion 14, together with another yoke 16 that is connected to the input shaft 8 of the steering gear unit 6 and a cross shaft (not illustrated), form the universal joint 4d, and has a base portion 17 and a pair of arm portions 18. The base portion 17 has a central portion in the radial direction on the other side in the axial direction thereof, that is continuous with a portion on the one side in the axial direction of the shaft portion 15. A portion on the outer side in the radial direction of the side surface on the other side in the axial direction of the base portion 17 is an annular surface 19 that exists on a virtual plane orthogonal to the center axis of the shaft portion 15.

The pair of arm portions 18 are formed in a substantially flat plate shape, and extend to the one side in the axial direction from two positions on diametrically opposite sides of the base portion 17. Moreover, circular holes 20 for rotatably supporting the shaft portion of the cross shaft are provided coaxially with each other in the tip end portions of the arm portions 18.

The shaft portion 15 has a substantially columnar shape and is formed in a solid shape over substantially the entire length. A hollow portion 21 that is opened only on the end surface on the other side in the axial direction of the shaft portion 15 is provided on the other side in the axial direction of the shaft portion 15. A male serration 22 is provided on the outer peripheral surface of the half portion on the other side in the axial direction of the shaft portion 15. On the other hand, a concave curved surface 23 having a concave arc-shaped cross section is provided on the outer peripheral surface of the end portion on the one side in the axial direction of the shaft portion 15. The concave curved surface 23 is a so-called corner R portion, has a single radius of curvature r, and is smoothly continuous on the annular surface 19 that is the side surface on the other side in the axial direction of the base portion 17 of the yoke portion 14.

The outer tube 13 is made of metal and has a hollow circular tubular shape. A pair of coupling cylinder portions 24a, 24b is provided on both side portions in the axial direction of the outer tube 13, and a bellows-like bellows portion 25 is provided at a middle portion in the axial direction of the outer tube 13.

A first female serration 26 is provided on the inner peripheral surface of the coupling cylinder portion 24a on the one side in the axial direction of the pair of coupling cylinder portions 24a, 24b, and a second female serration 27 is provided on the inner peripheral surface of the coupling cylinder portion 24b on the other side in the axial direction.

The bellows portion 25 is a portion that absorbs an impact load accompanying a collision by being plastically deformed so as to be bent at the time of an offset collision, and has a torsion strength such that the bellows portion 25 is not deformed by a load in the torsional direction applied due to the operator operating the steering wheel 1. The bellows portion 25 is configured by alternately arranging a plurality of peak portions, which are large-diameter portions, and valley portions, which are small-diameter portions, in the axial direction. In addition, in this example, the tops of the peak portions and the bottoms of the valley portions have an arc shaped cross section.

In order to couple the inner shaft 12 and the outer tube 13 so that torque may be transmitted and so that relative displacement in the axial direction at the time of a primary collision is possible, a male serration 22 of the inner shaft 12 and the first female serration 26 of the outer tube 13 engage with a serration engagement, and the fitting portion between the inner shaft 12 and the outer tube 13 is a so-called elliptical fitting. In other words, plastic deformation portions 28a, 28b having an elliptical cross section are respectively provided on the end portion on the other side in the axial direction of the shaft portion 15 of the inner shaft 12, and on the end portion on the one side in the axial direction of the coupling cylinder portion 24a of the outer tube 13. Note that in FIG. 3, the formation ranges of the plastic deformation portions 28a, 28b are indicated by wavy lines.

With the configuration described above, the portion on the other side in the axial portion of the shaft portion 15 of the inner shaft 12 and the coupling cylinder portion 24a of the outer tube 13 are coupled together so as to be able to transmit torque, and so that relative displacement in the axial direction is possible only at the time of a primary collision in which a large impact load is applied in the axial direction. In addition, the plastic deformation portions 28a, 28b become a resistance when the inner shaft 12 and the outer tube 13 relatively displace in the axial direction, so absorb energy due to a collision when the inner shaft 12 and the outer tube 13 displace relative to each other in the axial direction and the first telescopic shaft 9 contracts.

Plastic deformation portions 28a, 28b such as described above are formed, for example, as described below.

First, a portion on the other side in the axial direction of the shaft portion 15 is inserted a small amount into a portion on the one side in the axial direction of the outer tube 13. In other words, a portion on the one side in the axial direction of the coupling cylinder portion 24a and a portion on the other side in the axial direction of the shaft portion 15 engage. Next, the plastic deformation portions 28a, 28b are formed in the above portion by crushing the portion on the one side in the axial direction of the coupling cylinder portion 24a by a tool from the outside in the radial direction, which causes the inner peripheral surface of the portion on the one side in the axial direction of the coupling cylinder portion 24a and the outer peripheral surface of the portion on the other side in the axial direction of the shaft portion 15 to plastically deform so as to have an elliptical shaped cross section. Then, the inner shaft 12 and the outer tube 13 are relatively displaced in the axial direction so as to reduce the overall length of the first telescopic shaft 9, and this overall length of the first telescopic shaft 9 is defined as a specified length in the axial direction during normal operation. In this way, the plastic deformation portion 28a of the inner shaft 12 and the plastic deformation portion 28b of the outer tube 13 are separated from each other in the axial direction.

[Configuration of the Second Telescopic Shaft]

Figure 4:
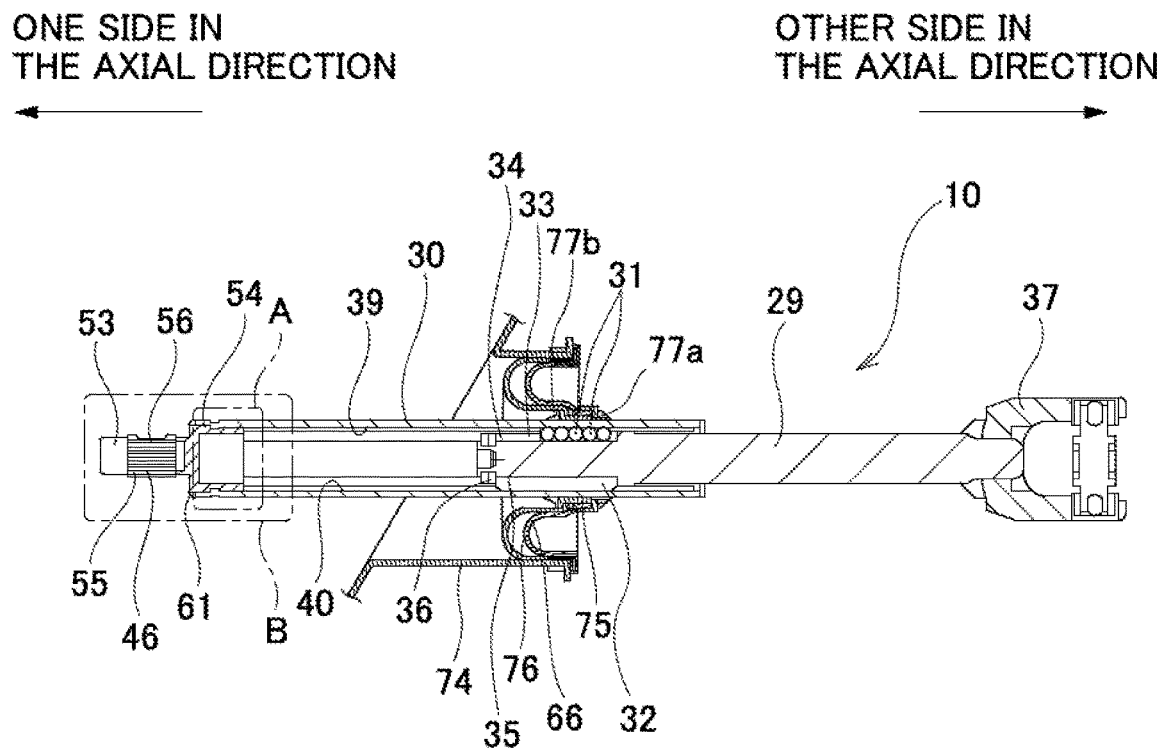
FIG. 4 is a cross-sectional view illustrating a second telescopic shaft that is take out of the intermediate shaft of the first example illustrated in FIG. 2 by separating the second telescopic shaft from the intermediate shaft at a position of a joint member.

As illustrated in FIG. 4, the second telescopic shaft 10 includes a male shaft 29 that is a small-diameter shaft, a female shaft 30 that is a large-diameter shaft, a plurality of balls 31, a plurality of rollers 32, a plurality of leaf springs 33, a male joint 46 as a joint shaft, and a dust cover 66. In the present example, the present invention is applied to a coupling portion between the female shaft 30 and the male joint 46 of the second telescopic shaft 10.

The male shaft 29 is formed in a solid shape over the entire length, and on the outer peripheral surface of a portion on the one side in the axial direction, has first male side axial grooves 34 and second male side axial grooves 35 that each extend in the axial direction and are alternately provided in the circumferential direction. The first male side axial grooves 34 have a substantially equilateral trapezoidal cross-sectional shape, and the circumferential width of the opening portion is larger than the circumferential width of the bottom portion. On the other hand, the second male side axial grooves 35 have a concave arc-shaped cross section. A ring-shaped stopper 36 is fixed to the outer peripheral surface of the end portion on the one side in the axial direction of the male shaft 29. As a result, the balls 31 that are arranged inside the first male side axial grooves 34 and the rollers 32 that are arranged inside the second male side axial grooves 35 are prevented from coming out to the one side in the axial direction from the first male side axial grooves 34 and the second male side axial grooves 35. In addition, a yoke 37 that is separate from the male shaft 29 is fixed to the end portion on the other side in the axial direction of the male shaft 29 by welding. The yoke 37, together with another yoke 38 that is connected to the front end portion of the steering shaft 2 and a cross shaft, constitute the universal joint 4c.

Figure 7:
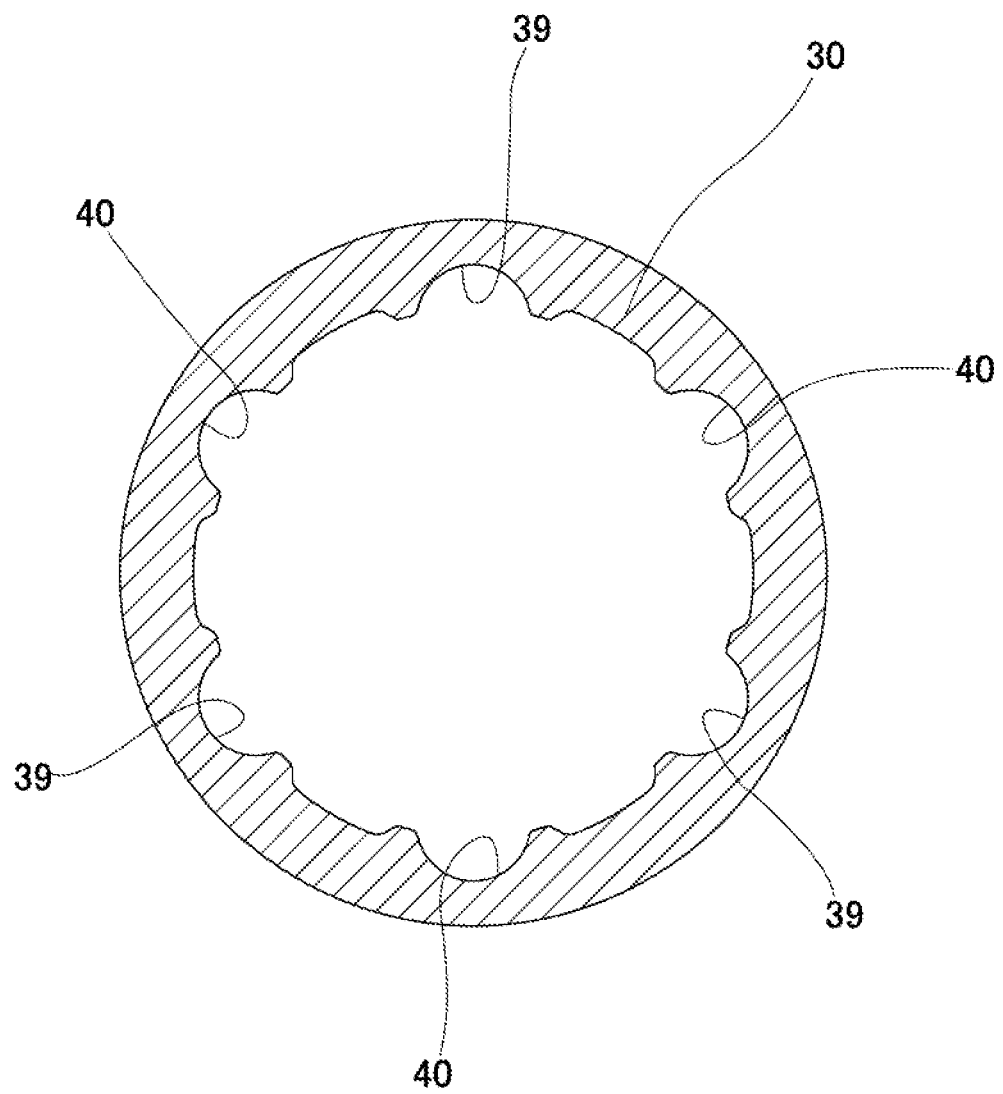
FIG. 7 is a cross-sectional view of section D-D in FIG. 5.

The female shaft 30 corresponds to a second shaft, and is entirely formed into a hollow tubular shape. As illustrated in FIG. 7, the female shaft 30, on the inner peripheral surface, has first female side axial grooves 39 and second female side axial grooves 40 that each extend in the axial direction, and are alternately provided in the circumferential direction. The first female side axial grooves 39 and the second female side axial grooves 40 have concave arc-shaped cross sections.

Figure 8:
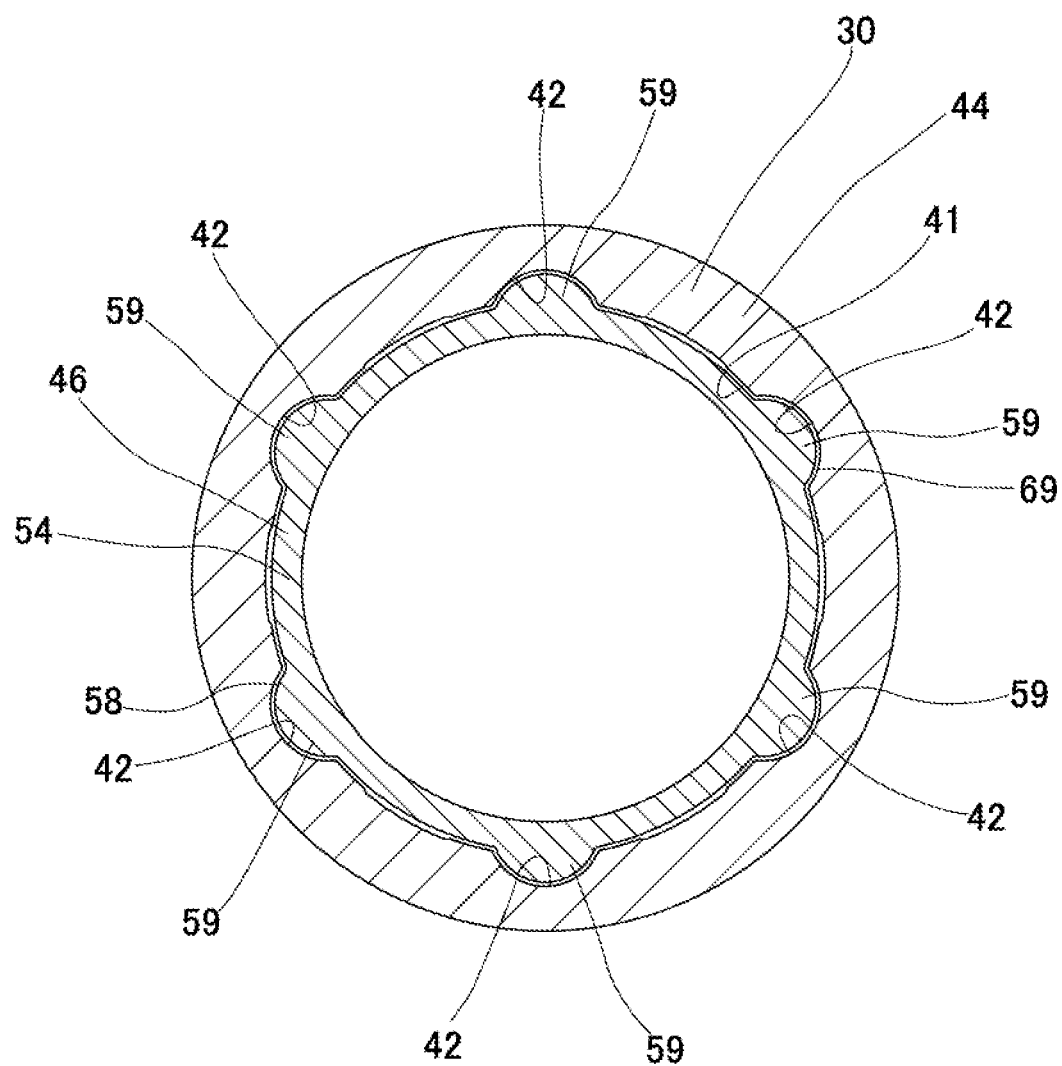
FIG. 8 is a cross-sectional view of section E-E in FIG. 5.
Figure 9:
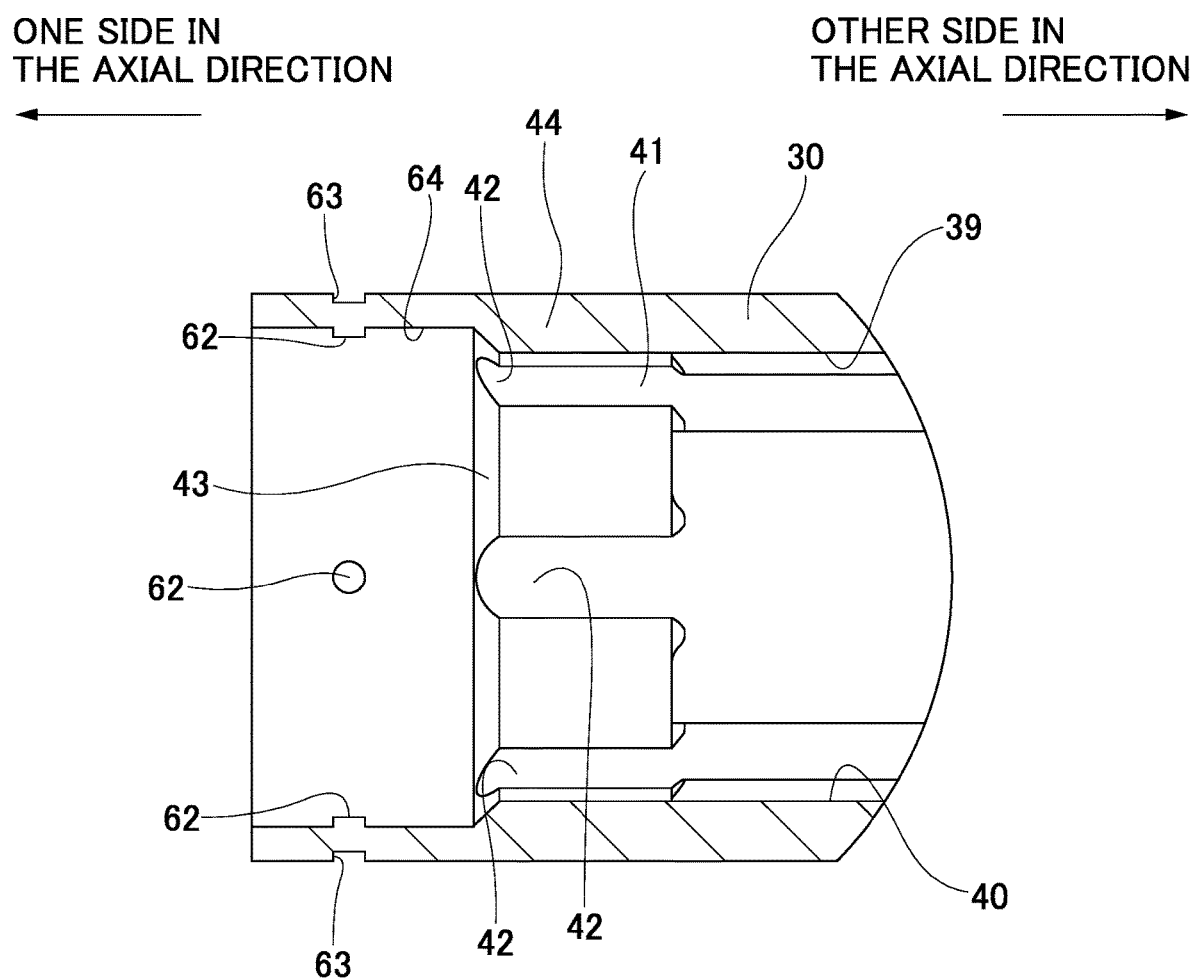
FIG. 9 is an end portion cross-sectional view of a female shaft corresponding to the second shaft of the first example.
Figure 10:
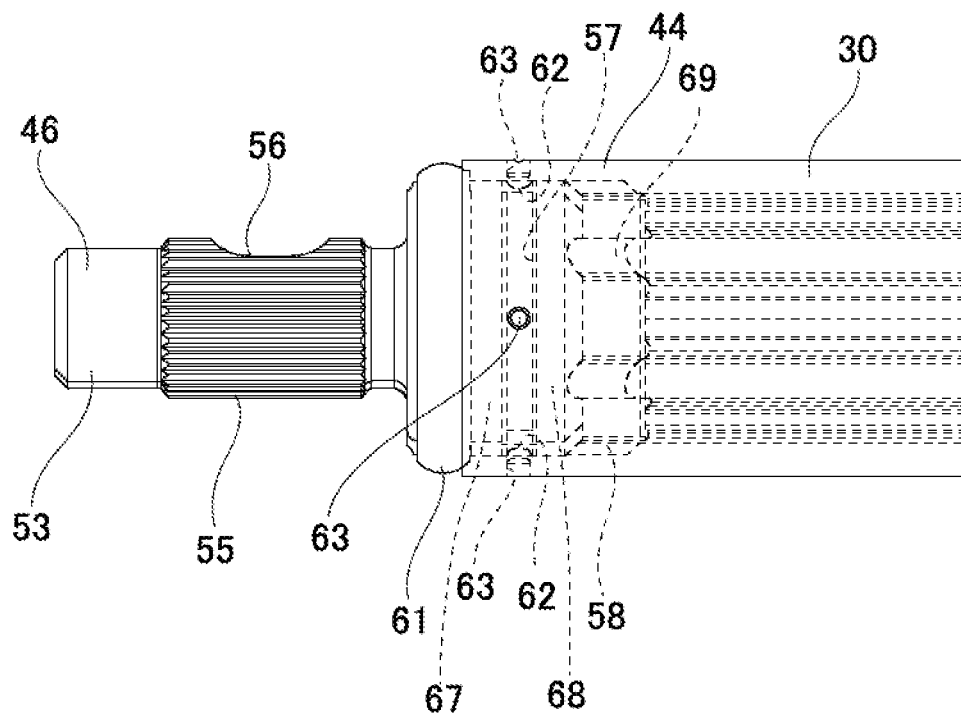
FIG. 10 is a partial perspective view of a portion corresponding to a portion B in FIG. 4.
Figure 11:
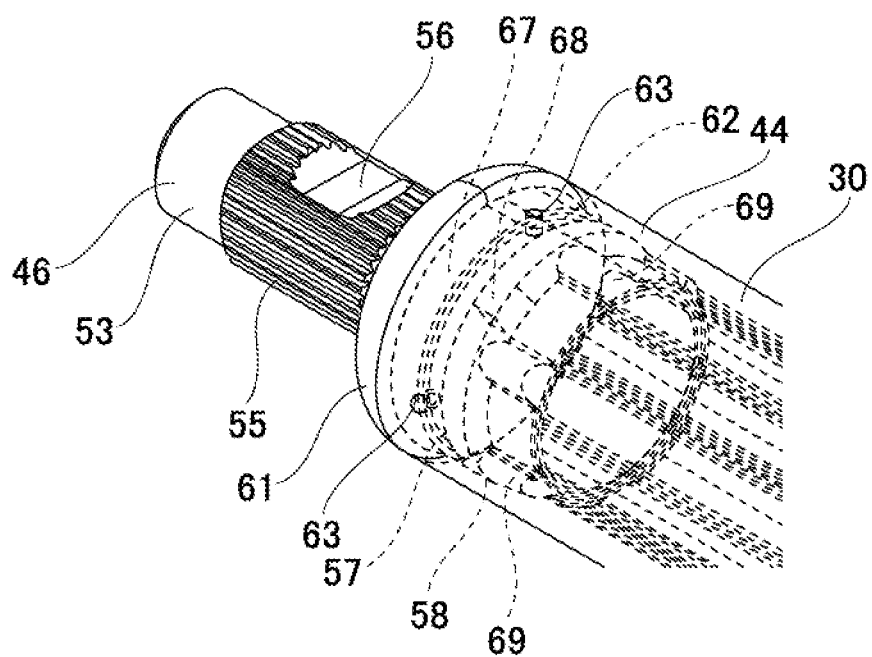
FIG. 11 is a partial perspective view of a portion corresponding to a portion B in FIG. 4.

The female shaft 30 is provided, on a portion on the one side in the axial direction, with a cylindrical-shaped fixed cylindrical portion 44 that corresponds to a second coupling portion into which a part of the male joint 46 is inserted. Of the inner peripheral surface of the fixed cylindrical portion 44, a portion adjacent to the one side of the first female side axial grooves 39 and the second female side axial grooves 40 in the axial direction has an inner peripheral side concave-convex portion 41 having a concave-convex shape in the circumferential direction. As illustrated in FIG. 8, the inner peripheral side concave-convex portion 41 is configured by forming a plurality of concave grooves 42 that extend in the axial direction and have a concave circular arc cross section on the cylindrical inner peripheral surface of the fixed cylindrical portion 44 so as to be uniformly spaced in the circumferential direction. The portions on the other side in the axial direction of the concave grooves 42 are continuous with the portions on the one side in the axial direction of the first female side axial grooves 39 and the second female side axial grooves 40. The cross-sectional shape of the concave grooves 42 and the cross-sectional shape of the first female side axial grooves 39 and the second female side axial grooves 40 are the same as each other. Moreover, as illustrated in FIG. 9, of the inner peripheral surface of a portion on the one side in the axial direction of the female shaft 30, there is a tapered abutment surface 43 on the one side in the axial direction of the inner peripheral side concave-convex portion 41, the inner diameter of which becomes larger going toward the one side in the axial direction. The concave grooves 42 are open at a plurality of equally spaced locations in the circumferential direction of the abutment surface 43. Furthermore, on the inner peripheral surface of the end portion on the one side in the axial direction of the female shaft 30, there is a cylindrical surface shaped large-diameter portion 64, the inner diameter of which is constant in the axial direction and the portion on the other side in the axial direction of which is continuous with a portion on the large-diameter side of the abutment surface 43.

When inserting the male shaft 29 inside the female shaft 30, the phases in the circumferential direction of the first male side axial grooves 34 and the first female side axial grooves 39 are matched, and the phases in the circumferential direction of the second male side axial grooves 35 and the second female side axial grooves 40 are matched. Then, a plurality of balls 31 are arranged between the first male side axial grooves 34 and the first female side axial grooves 39. Furthermore, leaf springs 33 are arranged between the first male side axial grooves 34 and the plurality of balls 31 to apply a preload to the plurality of balls 31. Moreover, one roller 32 each is arranged between the second male side axial grooves 35 and the second female side axial grooves 40.

In the second telescopic shaft 10 as described above, the male shaft 29 and the female shaft 30 are combined to be able to transmit torque and to be able to expand and contract over the entire length in a normal state. Particularly, in the second telescopic shaft 10, at the time of low torque transmission, the plurality of balls 31 and leaf springs 33 transmit torque between the male shaft 29 and the female shaft 30, and as the torque to be transmitted increases, the plurality of rollers 32 transmit the increased portion of the torque. Moreover, when there is relative displacement of the male shaft 29 and the female shaft 30 in the axial direction, the plurality of balls 31 roll between the first male side axial grooves 34 and the first female side axial grooves 39, and the plurality of rollers 32 slide between the second male side axial grooves 35 and the second female side axial grooves 40. Furthermore, in this example, the plurality of balls 31 are pressed against the inner surface of the first female side axial grooves 39 by the elastic force of the leaf springs 33, so looseness between the male shaft 29 and the female shaft 30 is prevented.

[Configuration of the Joint Members]

In this example, the first telescopic shaft 9 and the second telescopic shaft 10 as described above are coaxially coupled together by the joint member 11 so that torque may be transmitted. The joint member 11 has a female joint 45 and a male joint 46. The female joint 45 is fixed to the coupling cylinder portion 24b of the outer tube 13 of the first telescopic shaft 9, and the male joint 46 is fixed to the female shaft 30 of the second telescopic shaft 10.

The entire female joint 45 is formed into a substantially cylindrical shape. As illustrated in FIG. 3, a male serration 47 is provided on the outer peripheral surface of a portion on the one side in the axial direction of the female joint 45, and a female serration 48 is provided on the inner peripheral surface of a portion on the other side in the axial direction of the female joint 45. In addition, a slit 49 extending in the axial direction is provided in a half portion of the other side in the axial direction of the female joint 45, and a pair of flange portions 50 extending outward in the radial direction is provided on both sides of the slit 49 in the circumferential direction. Screw holes 51 that are coaxial with each other are provided in the pair of flange portions 50.

The male serration 47 that is provided on the outer peripheral surface on the one side in the axial direction of the female joint 45 is press-fitted (lightly press-fitted) into the second female serration 27 that is provided on the inner peripheral surface of the coupling cylinder portion 24b of the outer tube 13 and engages with a serration engagement. In addition, a weld bead portion 52 is used to weld and fix the entire circumference between the outer peripheral surface of the female joint 45 and the end surface on the other side in the axial direction of the coupling cylinder portion 24b. In this way, the female joint 45 and the outer tube 13 are coupled together so as to be able to transmit torque.

Figure 12:
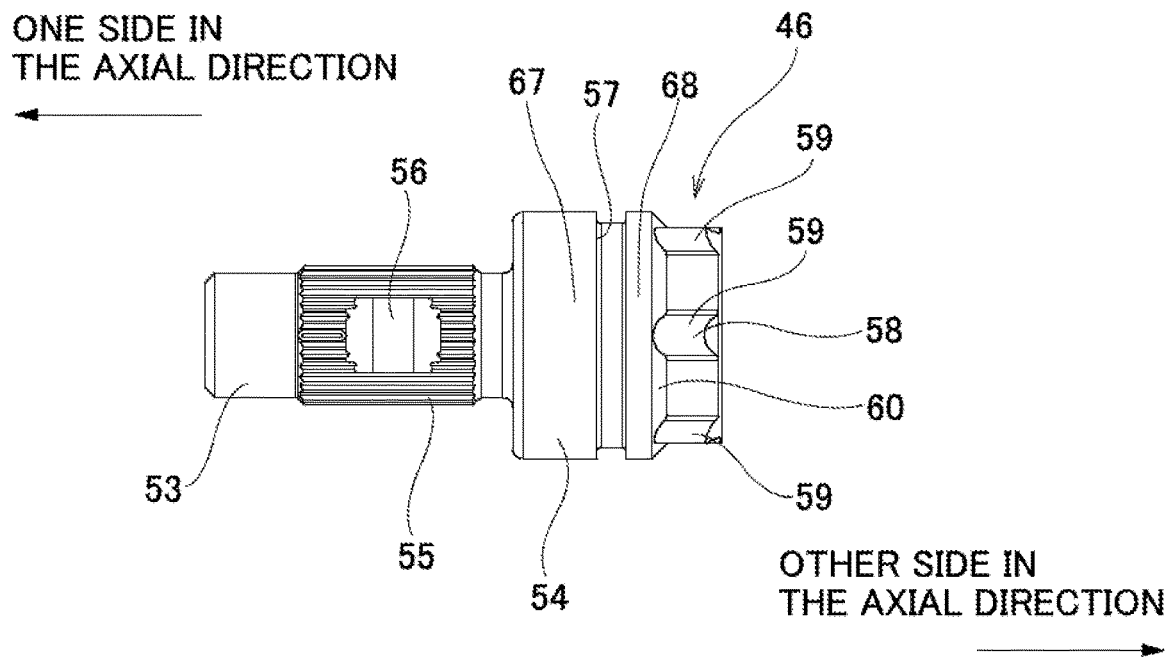
FIG. 12 is a side view of a male joint corresponding to the first shaft of the first example.
Figure 13:
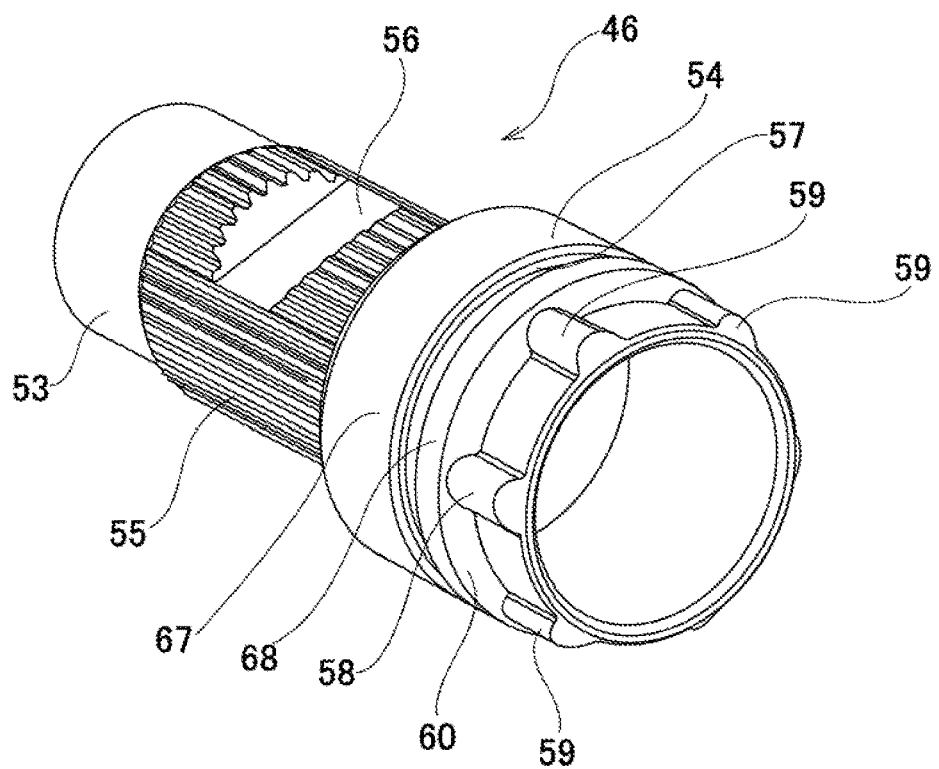
FIG. 13 is a perspective view of the male joint corresponding to the first shaft of the first example.

The male joint 46 corresponds to a first shaft, and as illustrated in FIG. 12 and FIG. 13, has a joint shaft portion 53 on the one side in the axial direction and a joint cylindrical portion 54 corresponding to a first coupling portion on the other side in the axial direction. On the outer peripheral surface of the joint shaft portion 53, a male serration 55 is provided over the entire circumference, and a notch 56 is provided in a part of the circumferential direction in a direction perpendicular to the center axis of the joint shaft portion 53. Note that, in this example, the front side in the insertion direction of the joint cylindrical portion 54 corresponds to the other side in the axial direction, and the rear side in the insertion direction of the joint cylindrical portion 54 corresponds to the one side in the axial direction.

The entire joint cylindrical portion 54 is configured to be substantially cylindrical. The joint cylindrical portion 54 has an outer peripheral side concave-convex portion 58 having a concave-convex shape in the circumferential direction on the outer peripheral surface on the other side in the axial direction. The outer peripheral side concave-convex portion 58 includes a plurality of ridges 59 each having a semi-cylindrical cross section that extends in the axial direction, formed on the cylindrical surface shaped outer peripheral surface on the other side in the axial direction of the joint cylindrical portion 54 so as to be uniformly spaced in the circumferential direction. In addition, the joint cylindrical portion 54 has an annular concave groove 57 that is recessed inward in the radial direction and formed around the entire outer peripheral surface of a middle portion in the axial direction that is positioned farther on the one side in the axial direction, which is the rear side in the insertion direction, than the outer peripheral side concave-convex portion 58. Moreover, the joint cylindrical portion 54 has a cylindrical surface shaped first support portion 67 farther on the one side than the axial direction, which is the rear side in the insertion direction, than the annular concave groove 57, and has a cylindrical surface shaped second support portion 68 between the annular concave groove 57 and the outer peripheral side concave-convex portion 58. Furthermore, of the outer peripheral surface of the joint cylindrical portion 54, between the end portions on the one side in the axial direction of ridges 59 that are adjacent in the circumferential direction, there are inclined surfaces 60 that are inclined in a direction outward in the radial direction while going toward the one side in the axial direction.

As illustrated in FIG. 2, the joint shaft portion 53 of the male joint 46 is inserted inside the portion on the other side in the axial direction of the female joint 45, and the male serration 55 and the female serration 48 are engaged in a serration engagement. In this way, the female joint 45 and the male joint 46 are coupled so as to be able to transmit torque. Furthermore, a bolt (not illustrated) is screwed into the screw holes 51 of the pair of flange portions 50 of the female joint 45. The middle portion of the bolt is arranged in the inner side of the notch 56 and prevents the joint shaft portion 53 from coming out of the female joint 45 toward the other side in the axial direction.

Figure 5:
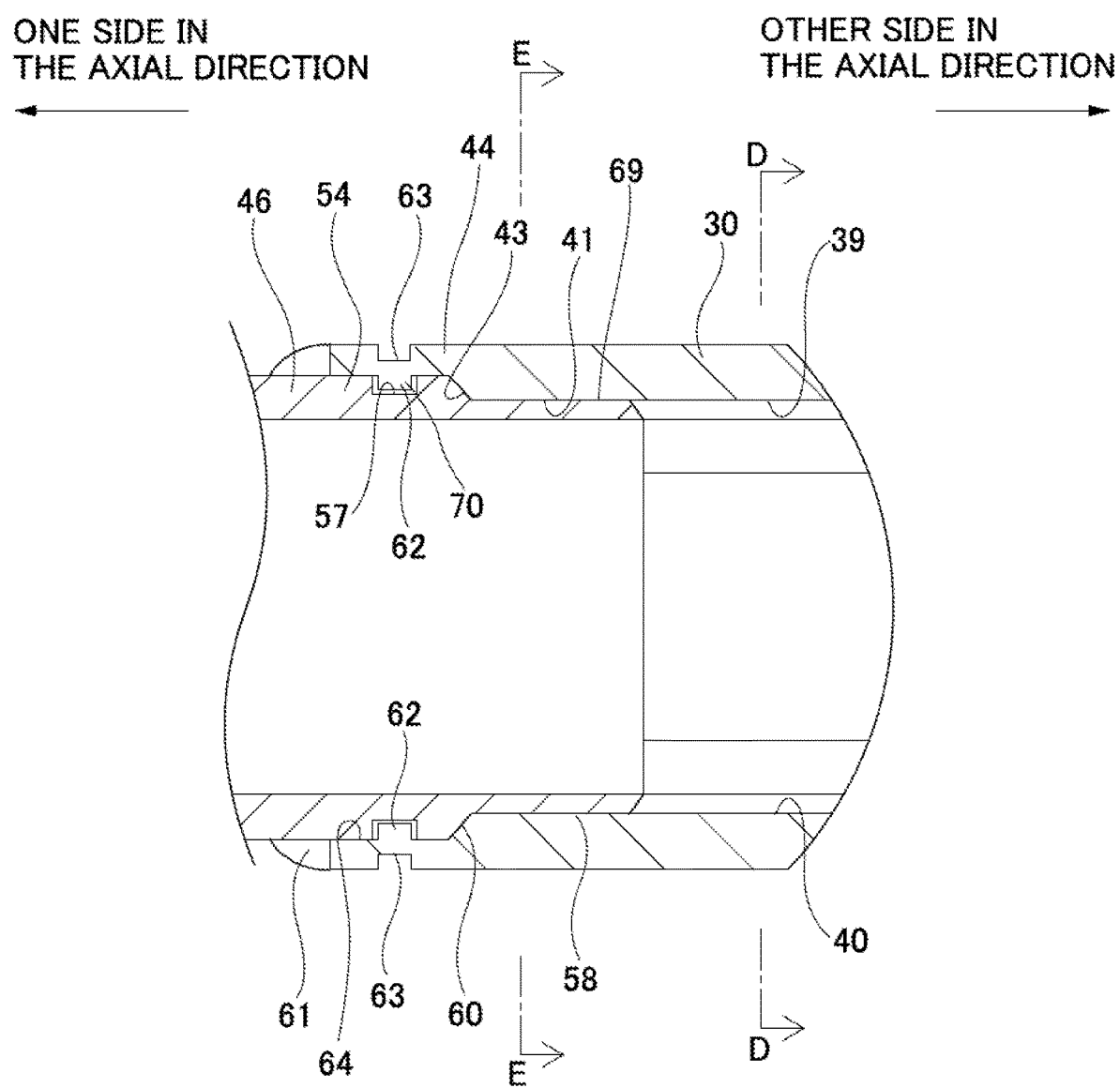
FIG. 5 is an enlarged view of a portion A in FIG. 4.
Figure 6:
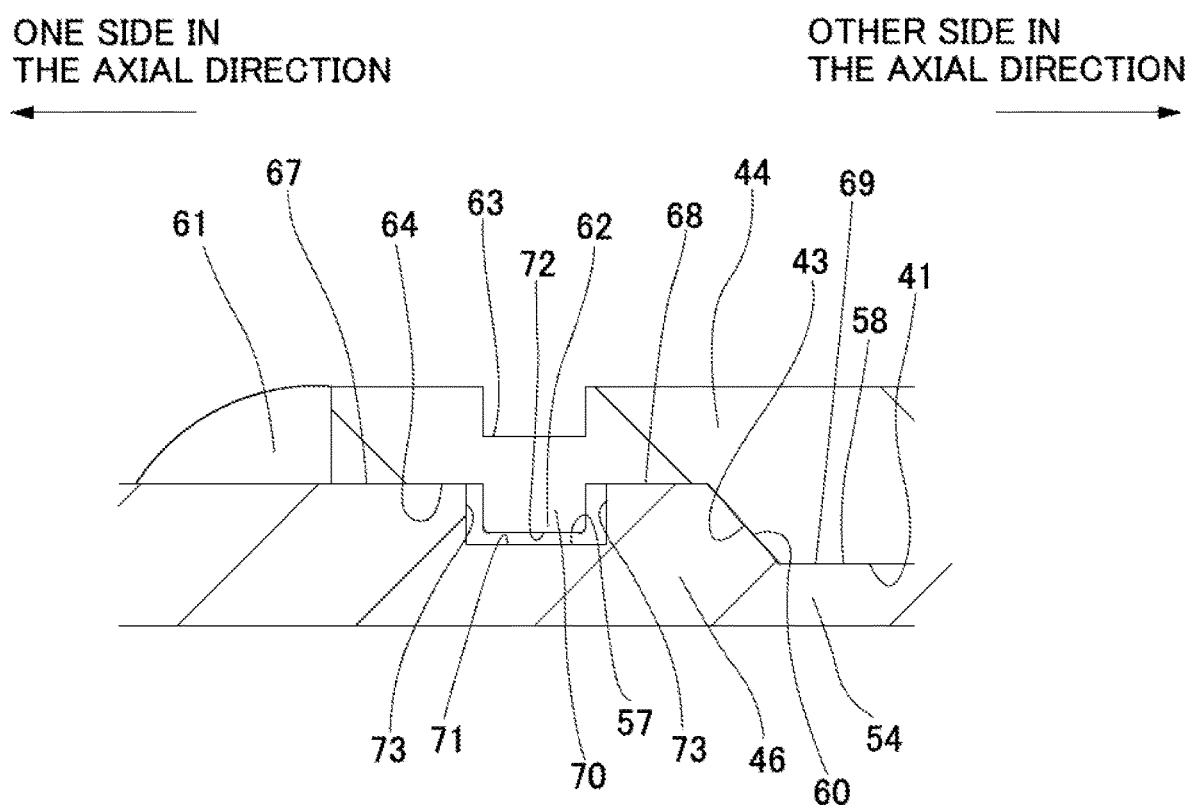
FIG. 6 is a partially enlarged view of FIG. 5.

In this example, as illustrated in FIG. 5 and FIG. 6, the joint cylindrical portion 54 of the male joint 46 is inserted inside the fixed cylindrical portion 44 of the female shaft 30 until the inclined surfaces 60 that are provided on the outer peripheral surface of the joint cylindrical portion 54 come in contact with the abutment surface 43 that is provided on the inner peripheral surface of the female shaft 30. In this way, together with positioning the male joint 46 with respect to the female shaft 30 in the axial direction, the plurality of ridges 59 of the outer peripheral side concave-convex portion 58 of the male joint 46 are respectively arranged inside the plurality of concave grooves 42 of the inner peripheral side concave-convex portion 41 of the female shaft 30, and the inner peripheral side concave-convex portion 41 and the outer peripheral side concave-convex portion 58 are press-fitted (lightly press-fitted) and the concave-convex portions engage. The inner peripheral side concave-convex portion 41 and the outer peripheral side concave-convex portion 58 constitute a torque transmitting portion 69. Note that, micro-projections (not illustrated) are provided on the outer peripheral surface of the ridges 59 of the outer peripheral side concave-convex portion 58 or on the inner peripheral surface of the concave grooves 42 of the inner peripheral side concave-convex portion 41, and by plastically deforming these micro-protrusions when the inner peripheral side concave-convex portion 41 and the outer peripheral side concave-convex portion 58 engage, it is possible to eliminate a gap between the outer surface of the outer peripheral side concave-convex portion 58 and the inner surface of the inner peripheral side concave-convex portion 41.

As illustrated in FIG. 5, FIG. 6, FIG. 10 and FIG. 11, a plurality of convex embossed portions 62 is provided on the inner peripheral surface of the fixed cylindrical portion 44 of the female shaft 30, and concave portions 63 are provided at a plurality of locations on the outer peripheral surface that coincide with the embossed portions 62. The embossed portions 62 are formed in portions of a large diameter portion 64, which is the inner peripheral surface of the portion on the one side of the fixed cylindrical portion 44 in the axial direction, that coincide in the axial direction with the annular concave groove 57 of the male joint 46, and are arranged inside the annular concave groove 57. The embossed portions 62 and the annular concave groove 57 constitute a retaining portion 70. The embossed portions 62 have a substantially columnar shape, and are provided so as to be uniformly spaced in the circumferential direction of the fixed cylindrical portion 44. In the illustrated example, the embossed portions 62 are provided at four positions that are shifted by a phase in the circumferential direction of 90 degrees each; however, the embossed portions 62 may be shifted by a phase in the circumferential direction of 180 degrees and provided at only two locations on opposite sides of the fixed cylindrical portion 44 in the radial direction. In this case as well, it is possible to sufficiently prevent the male joint 46 from coming out in the axial direction from the female shaft 30. As illustrated in FIG. 6, there is a gap in the radial direction between the bottom surface 71 of the annular concave groove 57 and the tip end surface 72 of the embossed portions 62, and there are gaps in the axial direction between the inner side surfaces 73 of the annular concave groove 57 that face each other and the embossed portions 62.

In this example, the embossed portions 62 are formed on the inner peripheral surface of the fixed cylindrical portion 44 as described in the following. In other words, the tip end portion of a tool (pin) having a columnar shape presses a plurality of locations in the circumferential direction on the outer peripheral surface of the fixed cylindrical portion 44 inward in the radial direction to semi-shear (cut out half of) this portion. In doing so, substantially cylindrical concave portions 63 are formed on the outer peripheral surface of the fixed cylindrical portion 44, and the convex embossed portions 62 are formed by causing a plurality of locations in the circumferential direction of the inner peripheral surface of the fixed cylindrical portion 44 to project inward in the radial direction. In short, by embossing the fixed cylindrical portion 44, concave portions 63 are formed on the outer peripheral surface of the fixed cylindrical portion 44, and the embossed portions 62 are formed by causing the material that is pushed out by forming the concave portions 63 to project inward in the radial direction from the inner peripheral surface of the fixed cylindrical portion 44. When forming the embossed portions 62, a pair of tools is arranged on opposite sides of the fixed cylindrical portion 44 in the radial direction, and two embossed portions 62 (concave portions 63) may be formed at the same time by moving the tip end portions of the pair of tools toward each other. The concave portions 63 have a depth dimension that is smaller than the plate thickness of the fixed cylindrical portion 44 and have an inner surface shape that matches the outer surface shape of the tip end portion of the tool. In addition, the embossed portions 62 have substantially the same height as the depth of the concave portions 63.

In this example, as described above, the convex embossed portions 62 are formed on the inner peripheral surface of the fixed cylindrical portion 44 by embossing using a small-diameter tool (pin), so together with being able to prevent the roundness of the outer peripheral surface of the fixed cylindrical portion 44 from being reduced, it is possible to keep the press load required for forming the embossed portions 62 low. Moreover, when embossing is performed, a weld bead portion 61 described below has not yet been formed between the female shaft 30 and the male joint 46; however, the inner peripheral side concave-convex portion 41 and the outer peripheral side concave-convex portion 58 are press fitted together, so together with being able to maintain concentricity between the female shaft 30 and the male joint 46, it is possible to prevent looseness between the female shaft 30 and the male joint 46. In addition, when forming the embossed portions 62, the force that is applied to the fixed cylindrical portion 44 from the tool may be supported by the first support portion 67 and the second support portion 68, so from this aspect as well, it is possible to prevent a reduction in the roundness of the outer peripheral surface of the fixed cylindrical portion 44. Furthermore, together with bringing about the existence of gaps in the radial direction between the bottom surface 71 of the annular concave groove 57 and the tip end surfaces 72 of the embossed portions 62, this also brings about the existence of gaps in the axial direction between the inner side surfaces 73 of the annular concave groove 57 that face each other and the embossed portions 62, so it is possible to prevent a reduction in roundness of the outer peripheral surface of the fixed cylindrical portion 44 due to the formation of the embossed portions 62.

As illustrated in FIG. 5, FIG. 6, FIG. 10 and FIG. 11, a portion of the outer peripheral surface of the joint cylindrical portion 54 that is exposed from the female shaft 30 and the end surface on the one side in the axial direction of the female shaft 30 welded and fixed by a weld bead portion 61 over the entire circumference. The weld bead portion 61 has a cross-sectional shape such as, for example, a substantially quarter circle shape, a substantially triangular shape, a substantially square shape, or the like, and has an outer diameter that is the same as the outer diameter of the fixed cylindrical portion 44 or smaller than the outer diameter of the fixed cylindrical portion 44. This kind of weld bead portion 61, retaining portion 70, and torque transmitting portion 69 are arranged side-by-side in this order in the axial direction from the one side to the other side in the axial direction (from the rear side to the front side in the insertion direction of the joint cylindrical portion 54).

Note that in this example, the joint cylindrical portion 54 is inserted inside the fixed cylindrical portion 44, and the embossed portions 62 are formed at a plurality of locations in the circumferential direction on the inner peripheral surface of the fixed cylinder portion 44, after which the weld bead portion 61 is formed in a portion separated in the axial direction from the embossed portions 62 between the outer peripheral surface of the joint cylindrical portion 54 and the end surface of the female shaft 30. This prevents the effect of welding heat that occurs when forming the weld bead portion 61 from being transmitted to the embossed portions 62. More specifically, the weld bead portion 61 and the embossed portions 62 arranged on the inner side of the annular concave groove 57 are separated from each by an amount equal to the dimension in the axial direction of the first support portion 67 that is provided on the outer peripheral surface of the joint cylindrical portion 54, so it is possible to effectively prevent welding heat from being transmitted to the embossed portions 62. Moreover, the weld bead portion 61 is also separated in the axial direction from the torque transmitting portion 69, so it is also possible to prevent the welding heat that occurs when forming the weld bead portion 61 from being transmitted to the torque transmitting portion 69. Furthermore, the inner peripheral side concave-convex portion 41 and the outer peripheral side concave-convex portion 58 are press fitted together, so when forming the weld bead portion 61, together with being able to maintain concentricity between the female shaft 30 and the male joint 46, it is also possible to prevent looseness between the female shaft 30 and the male joint 46.

The intermediate shaft 5a as described above is arranged so as to pass through a through hole (not illustrated) that is provided in a dash panel of the vehicle body. In the present example, a specified gap needs to be provided between the second telescopic shaft 10 and the through hole in the dash panel in order to allow the second telescopic shaft 10 to expand or contract in accordance with vibrations and the like while traveling. On the other hand, in order to prevent outside air that includes fine particles, dust, foreign matter and the like from entering inside the cabin, and to prevent mechanical noise and the like that is generated in the engine room from leaking into the vehicle interior, it is necessary to cover the gap between the second telescopic shaft 10 and the through hole in the dash panel. Therefore, as illustrated in FIG. 2 and FIG. 4, the dust cover 66 is externally fitted to the female shaft 30 of the second telescopic shaft 10. As a result, the gap between the inner peripheral surface of a cylindrical member 74 that is fixed to the through hole in the dash panel and the outer peripheral surface of the female shaft 30 is covered.

The dust cover 66 includes a bush portion 75, a bellows portion 76, and a pair of seal portions 77a, 77b. The bush portion 75 is a portion that functions as a sliding bearing, and, for example, is made of a synthetic resin, and is externally fitted to the female shaft 30 so as to be capable of relative rotation and relative movement in the axial direction with respect to the female shaft 30. The bellows portion 76, for example, is made of synthetic rubber, has a substantially U-shaped cross-sectional shape, and is flexible. The inner peripheral edge of this kind of bellows portion 76 is fixed to the outer peripheral surface of the bush portion 75 and the outer peripheral edge is fixed to the cylindrical member 74. The seal portion 77a is fixed to the end portion on the other side in the axial direction of the bush portion 75 to prevent foreign matter from entering inside of the bush portion 75 from the vehicle interior, and to prevent grease from leaking from the inner side of the bush portion 75 into the vehicle interior. On the other hand, the seal portion 77b is fixed to the end portion on the one side of the bush portion 75 in the axial direction and together with preventing foreign matter from entering inside the bush portion 75 from the engine room, prevent grease from leaking into the engine room from the inside of the bush portion 75. Moreover, the seal portions 77a, 77b suppress mechanical noise that is generated in the engine room from leaking into the vehicle interior.

In this example, the dust cover 66 such as described above is fitted to the female shaft 30 with the male joint 46 in a state of being fixed to the end portion on the one side in the axial direction of the female shaft 30. For this reason, in order to maintain the workability of the work of attaching the dust cover 66, the outer diameter from the end portion on the one side in the axial direction of the female shaft 30 to the portion where the dust cover 66 is fitted is smaller than the inner diameter of the bush portion 75, and is constant in the axial direction. In addition, the outer diameter of the weld bead portion 61 is smaller than the inner diameter of the bush portion 75. Note that the outer diameter from the end portion on the one side in the axial direction of the female shaft 30 to the portion where the dust cover 66 is fitted is slightly larger than the inner diameter of the seal portions 77a, 77b. Therefore, there is interference between the seal portions 77a, 77b and the outer peripheral surface of the female shaft 30.

In the normal state, the intermediate shaft 5a of the present example as described above expands and contracts by the relative displacement in the axial direction of the male shaft 29 and the female shaft 30 of the second telescopic shaft 10. This prevents vibration that is inputted from the tire during traveling from being transmitted to the steering wheel 1.

In a case where the entire front of the vehicle collides with another automobile and a so-called full-wrap collision occurs, the first telescopic shaft 9 and the second telescopic shaft 10 both contract. As a result, the intermediate shaft 5a contracts over the entire length while absorbing the impact load. This prevents the steering wheel 1 from being pushed up to the driver side.

On the other hand, in a case where a part of the front surface of the vehicle that is offset in the width direction collides with another automobile and a so-called offset collision occurs, the engine room may deform, and it may not be possible for the intermediate shaft 5a to contract in the axial direction. In this case, the outer tube 13 is bent at the bellows portion 25 due to the impact load accompanying the collision. As a result, together with the impact load being absorbed, displacement toward the rear is prevented by the bent intermediate shaft 5a being accommodated in the gaps existing between the intermediate shaft 5a and surrounding parts. Therefore, even in the case of an offset collision, it is possible to prevent the steering wheel 1 from being pushed up to the driver side. Note that when an offset collision occurs, whether or not the intermediate shaft 5a contracts over the entire length depends on how an impact load is applied, how the engine room is deformed, and the like.

In the present example having a configuration such as described above, in regard to the coupling between the male joint 46 and the female shaft 30 that are a pair of shafts constituting the intermediate shaft 5a as a torque transmitting shaft, even in a case where a defect occurs in the weld bead portion 61 that couples the male joint 46 and the female shaft 30, it is possible to maintain the torque transmission function, and to prevent separation of the male joint 46 and the female shaft 30.

In other words, even in a case where a defect occurs in the weld bead portion 61, the torque transmitting portion 69 that is formed by the engagement of the concave and convex portions of the outer peripheral side concave-convex portion 58 of the male joint 46 and the inner peripheral side concave-convex portion 41 of the female shaft 30 is able to transmit torque between the male joint 46 and the female shaft 30. Furthermore, the retaining portion 70, formed by arranging the embossed portions 62 formed on the inner peripheral surface of the female shaft 30 on the inner side of the annular concave groove 57 that is formed in the male joint 46, is able to prevent the male joint 46 from coming out in the axial direction from the female shaft 30.

In addition, the retaining portion 70 and the torque transmitting portion 69 are arranged so as to be separated in the axial direction from the weld bead portion 61. Therefore, it is possible to effectively prevent the welding heat that occurs when forming the welding bead portion 61 from being transmitted to the retaining portion 70 and the torque transmitting portion 69. Accordingly, it is possible to effectively prevent the torque transmission function from being impaired or the retaining function from being impaired due to the formation of the weld bead portion 61.

Moreover, since the convex embossed portions 62 of the retaining portion 70 are formed on the inner peripheral surface of the fixed cylindrical portion 44 by embossing using a small-diameter tool, it is possible to prevent a reduction in the roundness of the outer peripheral surface of the fixed cylindrical portion 44. Furthermore, in this example, also as the first support portion 67 and the second support portion 68 are provided on both sides of the annular groove 57 of the outer peripheral surface of the joint cylindrical portion 54, and a gap in the radial direction and gaps in the axial direction are provided between the embossed portions 62 and the annular concave groove 57, it is possible to prevent a reduction in the roundness of the outer peripheral surface of the fixed cylindrical portion 44. Therefore, it is possible to effectively prevent the dust cover 66 (the bush portion 75) from not being able to be externally fitted on the female shaft 30, and prevent a reduction of the workability of the work of externally fitting the dust cover 66.

Furthermore, in this example, in the assembled state of the intermediate shaft 5a, by visually confirming that the concave portions 63 are formed on the outer peripheral surface of the female shaft 30, it is possible to confirm that the embossed portions 62 are formed on the inner peripheral surface of the female shaft 30. In addition, the concave portions 63 that are formed on the outer peripheral surface of the female shaft 30 and the weld bead portion 61 are arranged so as to be spaced apart in the axial direction, so it is possible to prevent the concave portions 63 from being covered by the weld bead portion 61. For this reason, the work of checking whether or not the embossed portions 62 are formed can be easily performed.

Note that when implementing this example, the shaft portion 15 of the inner shaft 12 that constitutes the first telescopic shaft 9 may be provided with a male serration 22 over the entire length. In a case where such a configuration is adopted, torque may be transmitted between the inner shaft 12 and the outer tube 13 even in a state in which the entire length of the first telescopic shaft 9 is contracted.

Second Example

Figure 14:
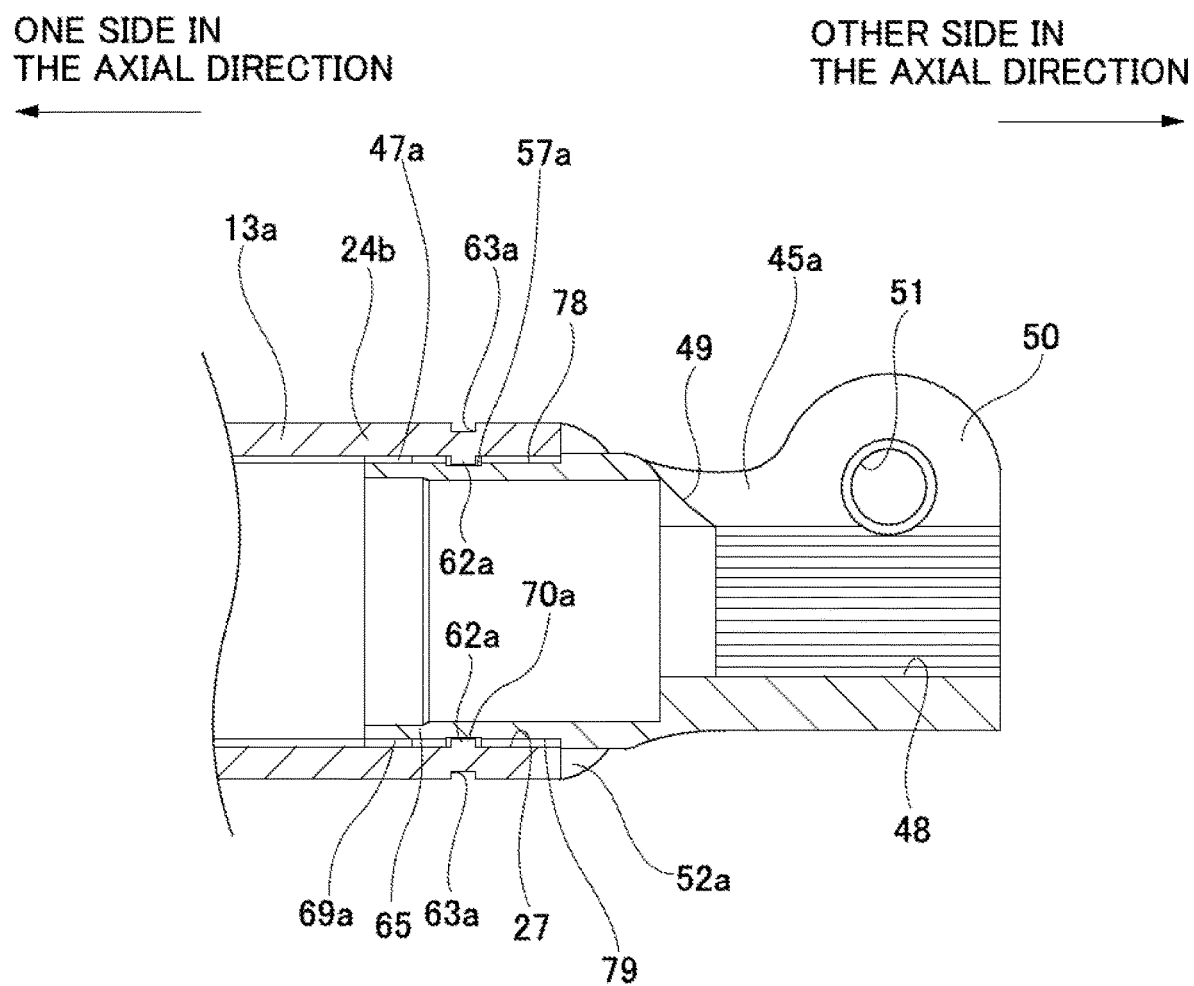
FIG. 14 is an enlarged view of a portion of a first telescopic shaft of a second example of an embodiment of the present invention, the portion corresponding to portion C in FIG. 3.
Figure 15:
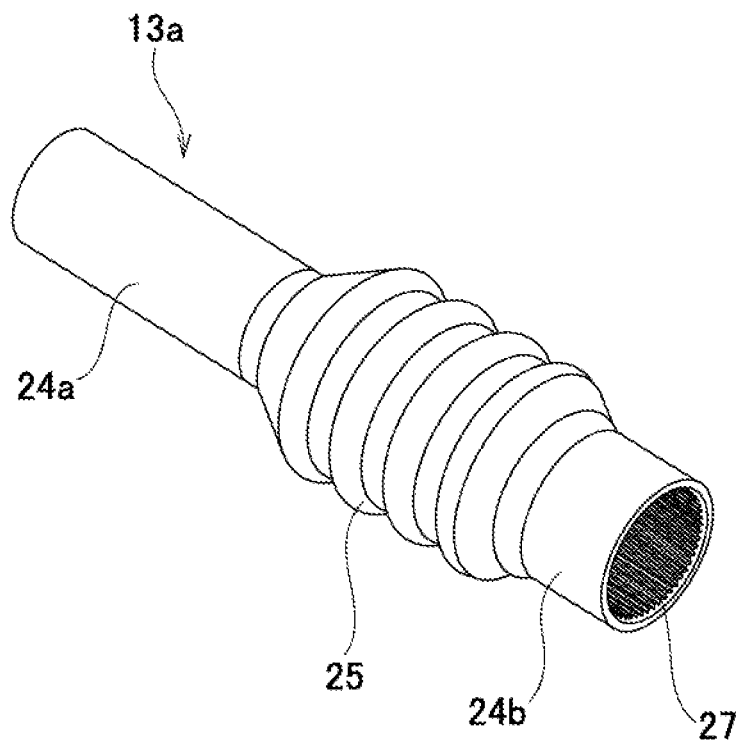
FIG. 15 is a perspective view of an outer tube corresponding to a second shaft of the second example.
Figure 16:
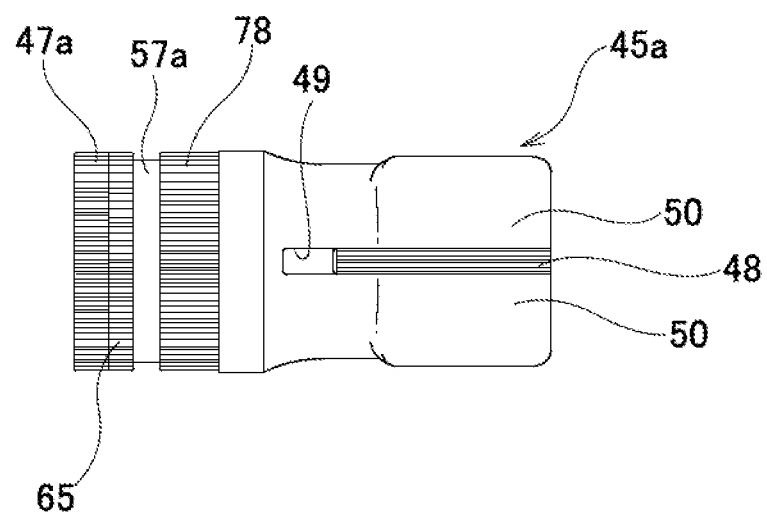
FIG. 16 is a side view of a female joint corresponding to a first shaft of the second example.

A second example of an embodiment of the present invention will be described with reference to FIG. 14 to FIG. 16. A feature of this example is that the coupling structure between the female joint 45a and the outer tube 13a, which is a pair of joints constituting the first telescopic shaft 9 of the intermediate shaft 5a, is devised. In this example, the female joint 45a is a first shaft and a joint shaft, and the outer tube 13a is a second shaft and a large-diameter shaft.

The female joint 45a has a cylindrical portion 65 on one side in the axial direction that corresponds to a first coupling portion. On the outer peripheral surface of the cylindrical portion 65, from the one side to the other in the axial direction (from the front side to the rear side in the insertion direction of the cylindrical portion 65), a male serration 47a having concave-convex shape in the circumferential direction corresponding to an outer peripheral side concave-convex portion, an annular concave groove 57a, and an auxiliary male serration 78 having a concave-convex shape in the circumferential direction corresponding to an auxiliary outer peripheral side concave-convex portion are arranged in the axial direction in this order. The male serration 47a is provided at an end portion on the one side in the axial direction, which is the front side in the insertion direction of the female joint 45a, of the outer peripheral surface of the cylindrical portion 65. The annular concave groove 57a is provided at an intermediate portion in the axial direction of the cylindrical portion 65 that is located on the other side in the axial direction of the male serration 47a. The auxiliary male serration 78 is provided farther on the other side in the axial direction, which is the rear side in the insertion direction of the female joint 45a, than the annular concave groove 57a. Therefore, in this example, an annular concave groove 57a, which is concave inward in the radial direction, is provided between the male serration 47a and the auxiliary male serration 78. On the other hand, a second female serration 27 having a concave-convex shape in the circumferential direction and corresponding to the inner peripheral side concave-convex portion is provided on the inner peripheral surface of the coupling cylinder portion 24b provided on the other side in the axial direction of the outer tube 13a that corresponds to the second coupling portion. Note that when implementing this example, the auxiliary male serration 78 may be omitted, and a cylindrical surface shaped first support portion may be provided.

The cylindrical portion 65 of the female joint 45a is inserted inside the coupling cylinder portion 24b of the outer tube 13a, and the male serration 47a and the second female serration 27 are press-fitted together and engage in a serration engagement. The male serration 47a and the second female serration 27 constitute a torque transmitting portion 69a. Furthermore, the auxiliary male serration 78 and the second female serration 27, by being press-fitted together and engaging in a serration engagement, constitute an auxiliary torque transmitting portion 79.

In addition, a plurality of convex embossed portions 62a formed in a portion of the inner peripheral surface of the coupling cylinder portion 24b that is aligned in the axial direction with the annular groove 57a of the female joint 45a are arranged in the inner side of the annular concave groove 57a to form a retaining portion 70a. The embossed portions 62a are provided at uniform intervals in the circumferential direction of the coupling cylinder portion 24b. Moreover, in this example as well, a plurality of locations in the circumferential direction on the outer peripheral surface of the coupling cylinder portion 24b are pressed inward in the radial direction by the tip end portion of a tool to semi-shear this portion. In doing so, substantially cylindrical concave portions 63a are formed on the outer peripheral surface of the coupling cylinder portion 24b, and a plurality of locations in the circumferential direction of the inner peripheral surface of the coupling cylinder portion 24b are made to project inward in the radial direction to form the convex embossed portions 62a.

Furthermore, the portion between the outer peripheral surface of the female joint 45a and the end surface on the other side in the axial direction of the coupling cylinder portion 24b is welded and fixed over the entire circumference by a weld bead portion 52a. Therefore, the weld bead portion 52a, the retaining portion 70a, and the torque transmitting portion 69a are arranged side-by-side in this order from the other side to the one side in the axial direction (from the rear side to the front side in the insertion direction of the cylindrical portion 65).

In this example as well, a portion on the one side of the female joint 45a in the axial direction is inserted inside the coupling cylinder portion 24b, and after the embossed portions 62a are formed at a plurality of locations in the circumferential direction on the inner peripheral surface of the coupling cylinder portion 24b, the weld bead portion 52a is formed between the outer peripheral surface of the female joint 45a and the end surface on the other side in the axial direction of the coupling cylindrical portion 24b that are separated from the embossed portions 62a in the axial direction. This prevents the effect of welding heat that occurs when forming the weld bead portion 52a from being transmitted to the embossed portions 62a.

In the present example having a configuration such as described above, even when a defect occurs in the weld bead portion 52a that couples the female joint 45a and the outer tube 13a, it is possible to maintain the torque transmitting function by the torque transmitting portion 69a and the auxiliary torque transmitting portion 79, and the retaining portion 70a is able to prevent the female joint 45a and the outer tube 13a from being separated. A structure such as in this example and the structure of the first example may also be implemented simultaneously.

Other configurations and operational effects are the same as those of the first example.

Third Example

Figure 17:
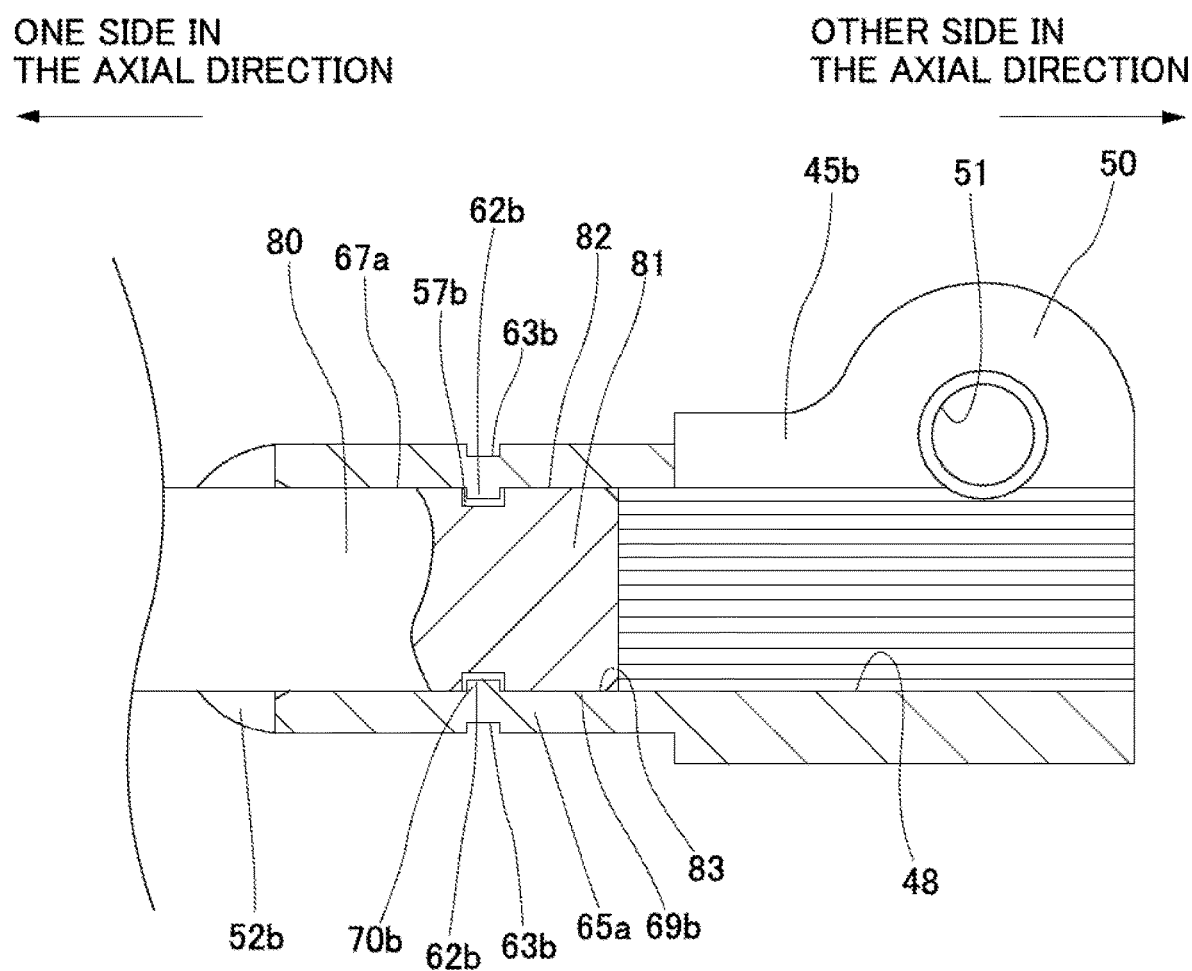
FIG. 17 is an enlarged view of a portion of a first telescopic shaft of a third example of an embodiment of the present invention, corresponds to FIG. 14.
Figure 18:
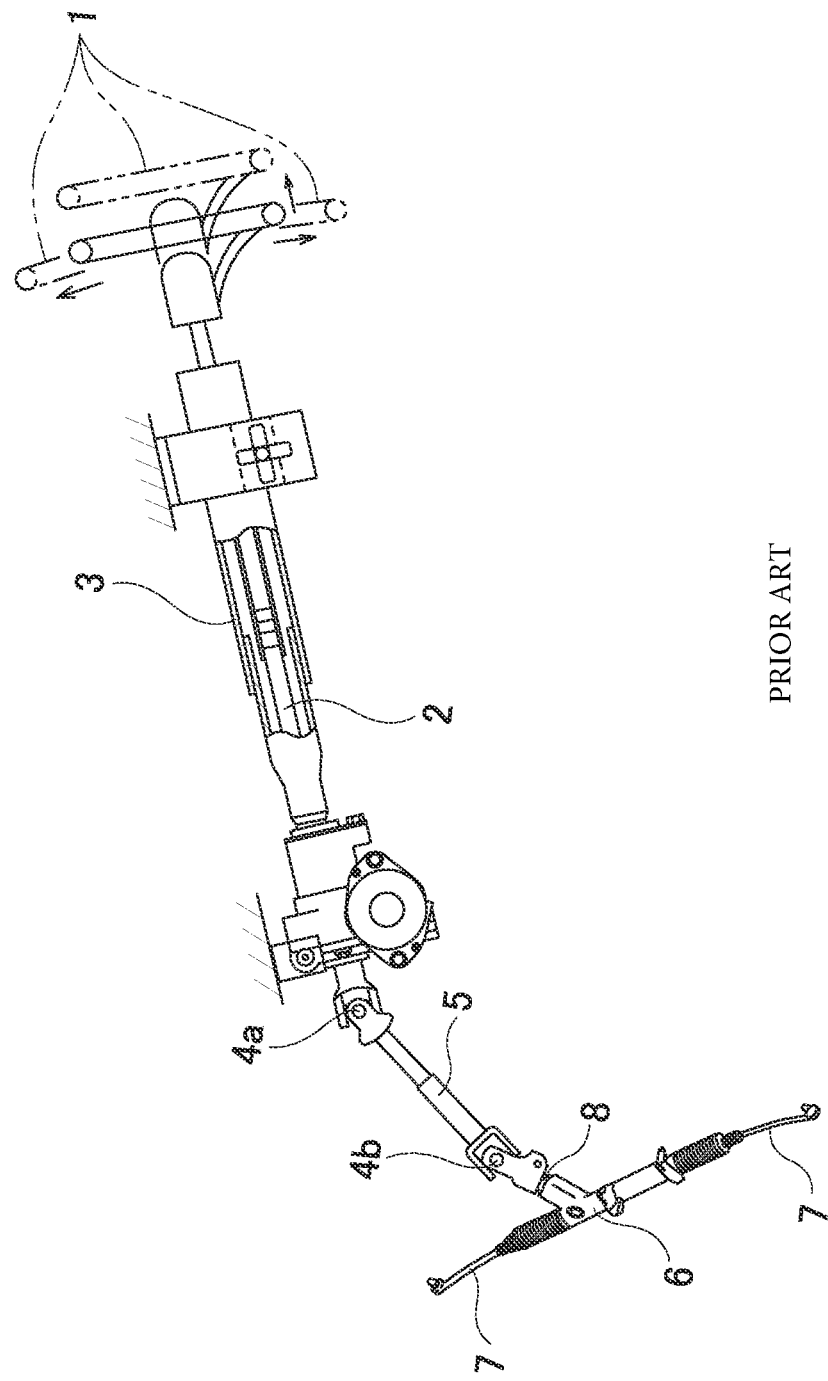
FIG. 18 is a partial cross-sectional side view illustrating a conventionally known steering apparatus.

A third example of an embodiment will be described with reference to FIG. 17. This example is a modification of the second example, and a feature of this example is that the coupling structure of a solid shaft 80, which is a small-diameter shaft internally fitted with a large-diameter shaft (not illustrated) so as to be able to transmit torque and so that relative displacement in the axial direction is possible, and a female joint 45b is devised. The solid shaft 80 is a first shaft, and the female joint 45b is a second shaft.

The solid shaft 80 has an insertion shaft portion 81 on the other side in the axial direction that corresponds to a first coupling portion. A male serration 82 having a concave-convex shape in the circumferential direction corresponding to an outer peripheral side concave-convex portion, an annular concave groove 57b, and a first support portion 67a are provided on the outer peripheral surface of the insertion shaft portion 81. The male serration 82 is provided at the end portion of the outer peripheral surface of the insertion shaft 81 on the other side in the axial direction, which is the front side in the insertion direction of the insertion shaft portion 81. The annular concave groove 57b is provided at an intermediate portion of the insertion shaft portion 81 that is positioned farther on the one side in the axial direction than the male serration 82. The first support portion 67a is provided farther on the one side in the axial direction, which is the rear side in the insertion direction of the insertion shaft portion 81, than the annular concave groove 57b. Therefore, in this example, the annular concave groove 57b that is concave inward in the radial direction is provided between the male serration 82 and the first support portion 67a. On the other hand, a female serration 83 having a concave-convex shape in the circumferential direction and corresponding to an inner peripheral side concave-convex portion is provided on the inner peripheral surface of a cylindrical portion 65a corresponding to a second coupling portion at a portion on the one side in the axial direction of the female joint 45b.

By inserting the insertion shaft portion 81 of the solid shaft 80 inside the cylindrical portion 65a of the female joint 45b, the male serration 82 and the female serration 83 are press-fitted together and engage in a serration engagement. The male serration 82 and the female serration 83 constitute a torque transmitting portion 69b.

In addition, a plurality of convex embossed portions 62b that are formed on a portion of the inner peripheral surface of cylindrical portion 65a that coincides in the axial direction with the annular concave groove 57b of the solid shaft 80 are arranged on the inner side of the annular concave groove 57b to form a retaining portion 70b. Concave portions 63b are provided portions of the outer peripheral surface of the cylindrical portion 65a that coincide with the embossed portions 62b.

Furthermore, the portion between the outer peripheral surface of the solid shaft 80 and the end surface on the one side of the cylindrical portion 65a in the axial direction is welded and fixed over the entire circumference by a weld bead portion 52b. Therefore, the weld bead portion 52b, the retaining portion 70b, and the torque transmitting portion 69b are arranged side-by-side in this order from the one side to the other side in the axial direction (from the front side to the rear side in the insertion direction of the cylindrical portion 65a).

In the present example having a configuration such as described above, even when a defect occurs in the weld bead portion 52b that couples the solid shaft 80 and the female joint 45b, the torque transmitting portion 69b is able to maintain the torque transmitting function, and the retaining portion 70b is able to prevent separation between the solid shaft 80 and the female joint 45b. Other configurations and operational effects are the same as those of the first and second examples.

When implementing the present invention, the number and shape of the embossed portions that are formed on the inner peripheral surface of the second coupling portion are not limited to the structures described in each example of an embodiment of the present invention, and the structure may be modified as long as the function for preventing the first shaft from coming out of the second shaft may be achieved.

REFERENCE SIGNS LIST

1 Steering wheel
2 Steering shaft
3 Steering column
4a, 4b, 4c, 4d Universal joint
5, 5a Intermediate shaft
6 Steering gear unit
7 Tie rod
8 Input shaft
9 First telescopic shaft
10 Second telescopic shaft
11 Joint member
12 Inner shaft
13, 13a Outer tube
14 Yoke portion
15 Shaft portion
16 Yoke
17 Base portion
18 Arm portion
19 Annular surface
20 Circular hole
21 Hollow portion
22 Male serration
23 Concave curved surface 24a, 24b Coupling cylinder portion
25 Bellows portion
26 First female serration
27 Second female serration
28a, 28b Plastic deformation portion
29 Male shaft
30 Female shaft
31 Ball
32 Roller
33 Leaf spring
34 First male side axial groove
35 Second male side axial groove
36 Stopper
37 Yoke
38 Yoke
39 First female side axial groove
40 Second female side axial groove
41 Inner peripheral side concave-convex portion
42 Concave groove
43 Abutment surface
44 Fixed cylindrical portion
45, 45a, 45b Female joint
46 Male joint
47 Male serration
48 Female serration
49 Slit
50 Flange portion
51 Screw hole
52, 52a, 52b Weld bead portion
53 Joint shaft portion
54 Joint cylindrical portion
55 Male serration
56 Notch
57, 57a, 57b Annular concave groove
58 Outer peripheral side concave-convex portion
59 Ridge
60 Inclined surface
61 Weld bead portion
62, 62a, 62b Embossed portion
63, 63a, 63b Concave portion
64 Large diameter portion
65, 65a Cylindrical portion
66 Dust cover
67, 67a First support portion
68 Second support portion
69, 69a, 69b Torque transmitting portion
70, 70a, 70b Retaining portion
71 Bottom surface
72 Tip end surface
73 Inner side surface
74 Cylindrical member
75 Bush portion
76 Bellows portion
77a, 77b Seal portion
78 Auxiliary male serration
79 Auxiliary torque transmitting portion
80 Solid shaft
81 Insertion shaft portion
82 Male serration
83 Female serration

The invention claimed is:

1. A shaft coupling structure, comprising:
a first shaft having a first coupling portion;
a second shaft having a second coupling portion having a cylindrical shape into which the first coupling portion is inserted; and
a weld bead portion that welds and fixes together an end portion in an axial direction of the second coupling portion and a portion of an outer peripheral surface of the first shaft that is exposed from the second coupling portion;
the first coupling portion, on an outer peripheral surface thereof, having an outer peripheral side concave-convex portion having a concave-convex shape in a circumferential direction and is arranged on an end portion on a front side in an insertion direction of the first coupling portion, and an annular concave groove that is arranged farther on a rear side in the insertion direction of the first coupling portion than the outer peripheral side concave-convex portion;
the second coupling portion, on an inner peripheral surface thereof, having an inner peripheral side concave-convex portion having an concave-convex shape in a circumferential direction and constitutes a torque transmitting portion by engaging with the outer peripheral side concave-convex portion with a concave-convex engagement, and a convex embossed portion that is arranged on an inner side of the annular concave groove and constitutes a retaining portion, and, in a portion of an outer peripheral surface thereof that coincides with the embossed portion, having a concave portion; and
the weld bead portion, the retaining portion, and the torque transmitting portion being arranged side-by-side in this order in an axial direction of the first shaft.

2. The shaft coupling structure according to claim 1, wherein
the outer peripheral side concave-convex portion is press-fitted together with the inner peripheral side concave-convex portion.

3. The shaft coupling structure according to claim 1, wherein
the embossed portion is arranged at a plurality of locations in the circumferential direction of the second coupling portion.

4. The shaft coupling structure according to claim 3, wherein
the embossed portion is arranged at two or four locations at uniform intervals in the circumferential direction of the second coupling portion.

5. The shaft coupling structure according to claim 1, wherein
a gap in a radial direction of the first shaft is provided between a bottom surface of the annular concave groove and a tip end surface of the embossed portion.

6. The shaft coupling structure according to claim 1, wherein
gaps in the axial direction of the first shaft are provided between inner side surfaces of the annular concave groove that face each other and the embossed portion.

7. The shaft coupling structure according to claim 1, wherein
the first coupling portion has a first support portion having a cylindrical surface shape that is farther on the rear side in the insertion direction of the first coupling portion than the annular concave groove.

8. The shaft coupling structure according to claim 7, wherein
the first coupling portion has a second support portion having a cylindrical surface shape between the annular concave groove and the outer peripheral side concave-convex portion.

9. The shaft coupling structure according to claim 1, wherein
the first coupling portion, on a portion farther on the rear side in the insertion direction of the first coupling portion than the annular concave groove, has an auxiliary outer peripheral side concave-convex portion having a concave-convex shape in the circumferential direction that engages with the inner peripheral side concave-convex portion with a concave-convex engagement.

10. A telescopic shaft comprising:
a large-diameter shaft;
a small-diameter shaft fitted inside the large-diameter shaft and capable of transmitting torque to the large-diameter shaft and displacing in an axial direction relative to the large-diameter shaft; and
a joint shaft coupled to an end portion of the large-diameter shaft in the axial direction; wherein
the large-diameter shaft and the joint shaft are coupled together by the shaft coupling structure according to claim 1, the large diameter shaft is the second shaft, and the joint shaft is the first shaft.

11. The telescopic shaft according to claim 10, comprising
a dust cover externally fitted to the large-diameter shaft; wherein
the large-diameter shaft has an outer diameter that is constant in the axial direction from an end portion in the axial direction on a side where the joint shaft is coupled to a portion where the dust cover is externally fitted.

12. The telescopic shaft according to claim 10, wherein
the telescopic shaft constitutes an intermediate shaft of a steering apparatus for an automobile, and is configured to be able to expand and contract over an entire length in a normal state where no collision accident occurs in the automobile.

13. The telescopic shaft according to claim 10, wherein
the telescopic shaft constitutes an intermediate shaft of a steering apparatus for an automobile, and is configured to be able to contract over an entire length only when a collision accident occurs in the automobile and a load of a specified magnitude or greater is applied in the axial direction to the telescopic shaft.

14. A telescopic shaft comprising:
a large-diameter shaft;
a small-diameter shaft fitted inside the large-diameter shaft and capable of transmitting torque to the large-diameter shaft and displacing in an axial direction relative to the large-diameter shaft; and
a joint shaft coupled to an end portion of the small-diameter shaft in the axial direction; wherein
the small-diameter shaft and the joint shaft are coupled together by the shaft coupling structure according to claim 1, the small-diameter shaft is the first shaft, and the joint shaft is the second shaft.

15. The telescopic shaft according to claim 14, wherein
the telescopic shaft constitutes an intermediate shaft of a steering apparatus for an automobile, and is configured to be able to expand and contract over an entire length in a normal state where no collision accident occurs in the automobile.

16. The telescopic shaft according to claim 14, wherein
the telescopic shaft constitutes an intermediate shaft of a steering apparatus for an automobile, and is configured to be able to contract over an entire length only when a collision accident occurs in the automobile and a load of a specified magnitude or greater is applied in the axial direction to the telescopic shaft.

* * * * *